(12) United States Patent
Uchida et al.

(10) Patent No.: US 10,585,824 B2
(45) Date of Patent: Mar. 10, 2020

(54) TRANSMISSION CONTROL PREVENTING TRANSMISSION OF SIMILAR COMMANDS IN OVERLAPPING MANNER

(71) Applicant: NEC Corporation, Minato-ku, Tokyo (JP)

(72) Inventors: Norio Uchida, Tokyo (JP); Toru Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/079,171

(22) PCT Filed: Feb. 20, 2017

(86) PCT No.: PCT/JP2017/006194
§ 371 (c)(1),
(2) Date: Aug. 23, 2018

(87) PCT Pub. No.: WO2017/145997
PCT Pub. Date: Aug. 31, 2017

(65) Prior Publication Data
US 2019/0057055 A1   Feb. 21, 2019

(30) Foreign Application Priority Data
Feb. 26, 2016   (JP) .................. 2016-035407

(51) Int. Cl.
*G06F 3/00*       (2006.01)
*G06F 13/00*      (2006.01)
(Continued)

(52) U.S. Cl.
CPC ......... *G06F 13/20* (2013.01); *G05B 19/4185* (2013.01); *G06F 13/00* (2013.01); *G06F 13/102* (2013.01); *G06F 13/12* (2013.01)

(58) Field of Classification Search
CPC ............ G06F 3/00; G06F 13/00; G06F 13/14
See application file for complete search history.

(56) References Cited

U.S. PATENT DOCUMENTS

| 2011/0194568 A1* | 8/2011 | Ozawa .................. H04L 1/0002 370/465 |
| 2012/0047551 A1 | 2/2012 | Pattar et al. |
| 2016/0044527 A1* | 2/2016 | Long ..................... H04L 1/1642 370/235 |

FOREIGN PATENT DOCUMENTS

| JP | 2003-264679 A | 9/2003 |
| JP | 2012-105129 A | 5/2012 |

(Continued)

OTHER PUBLICATIONS

International Search Report for PCT Application No. PCT/JP2017/006194, dated Mar. 28, 2017.

(Continued)

*Primary Examiner* — David E Martinez

(57) ABSTRACT

According to the present invention, congestion in a network band is suppressed. This information processing apparatus is provided with: a command reception unit that receives commands from at least one application given to at least two device groups; a device specification unit that specifies devices belonging to the at least two device groups when the commands from the at least one application given to the at least two device groups are of a similar type; and a command transmission control unit that executes control transmission so as to prevent overlap of transmission of the commands to the specified devices.

8 Claims, 24 Drawing Sheets

(51) Int. Cl.
*G06F 13/14* (2006.01)
*G06F 13/20* (2006.01)
*G06F 13/12* (2006.01)
*G05B 19/418* (2006.01)
*G06F 13/10* (2006.01)

(56) References Cited

FOREIGN PATENT DOCUMENTS

| | | |
|---|---|---|
| JP | 5678094 B2 | 2/2015 |
| WO | 2013/095773 A1 | 6/2013 |

OTHER PUBLICATIONS

English translation of Written opinion for PCT Application No. PCT/JP2017/006194.

\* cited by examiner

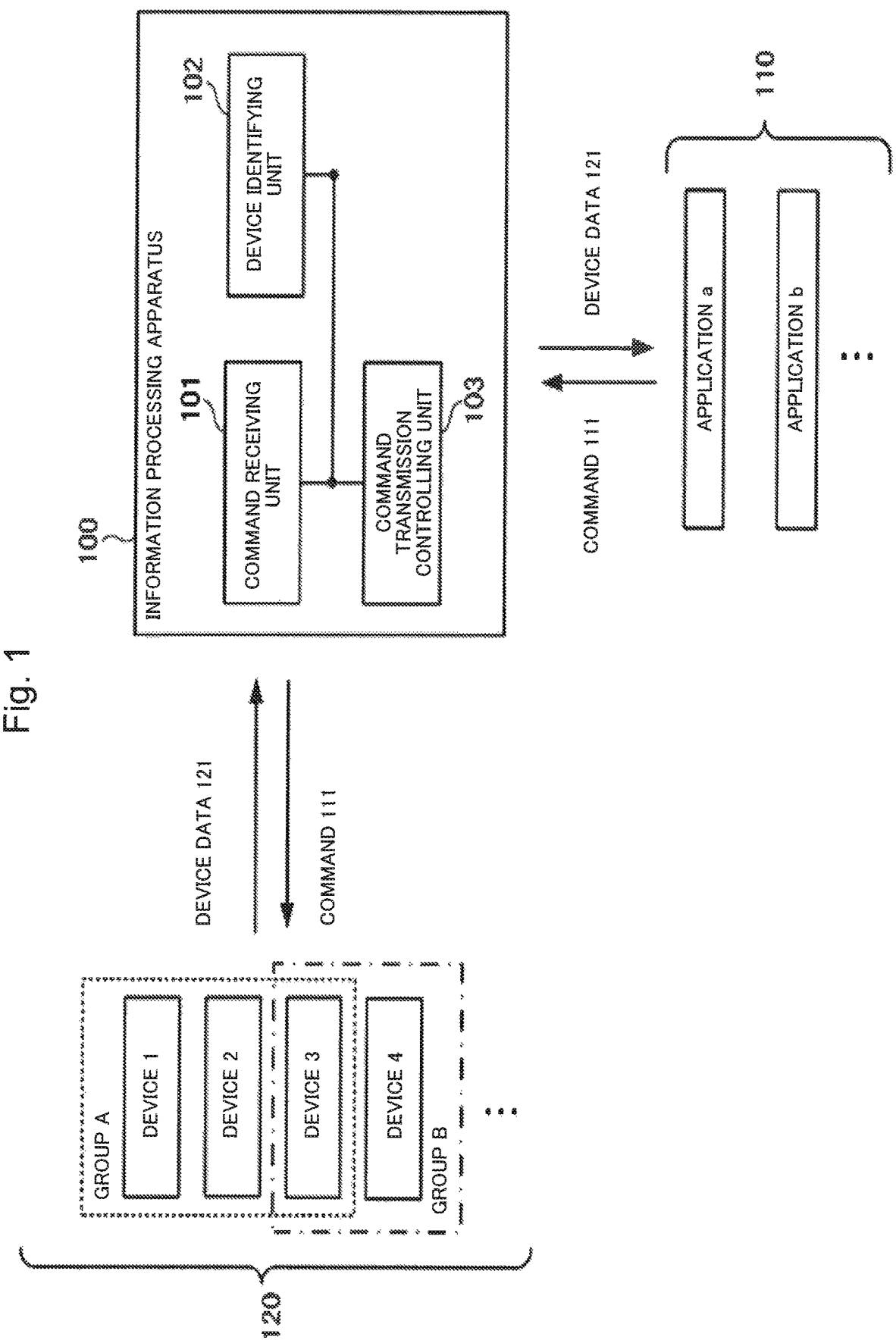

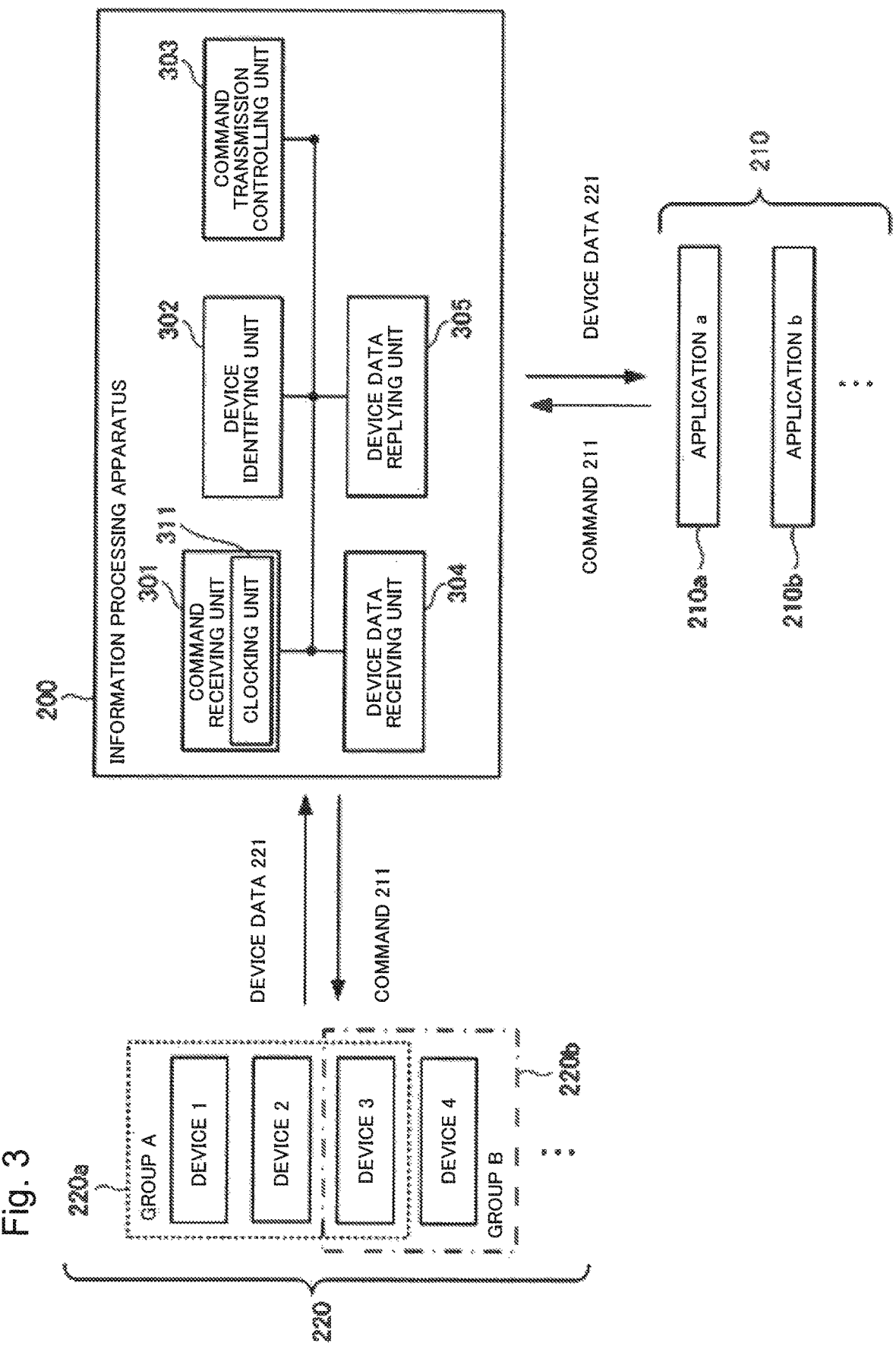

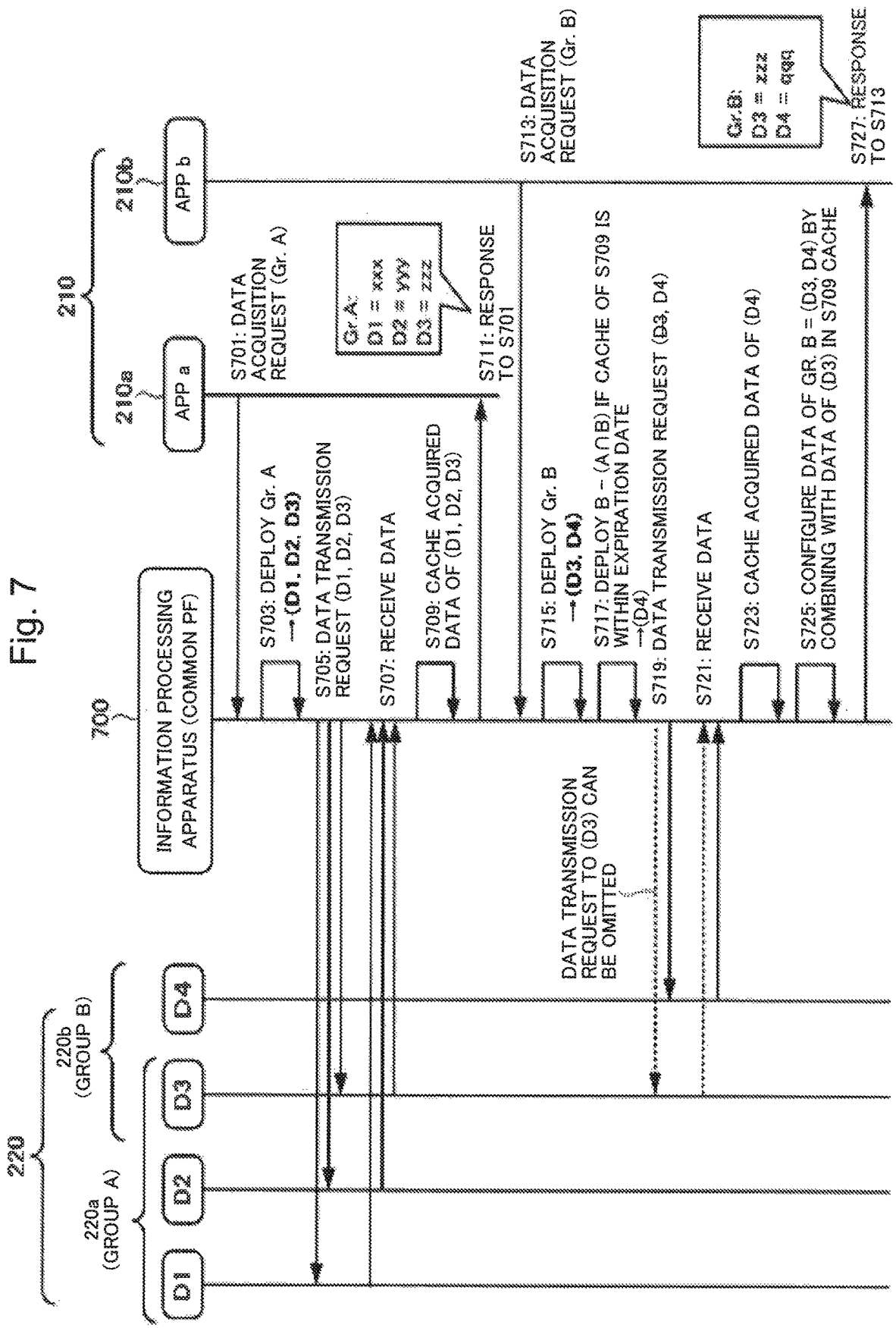

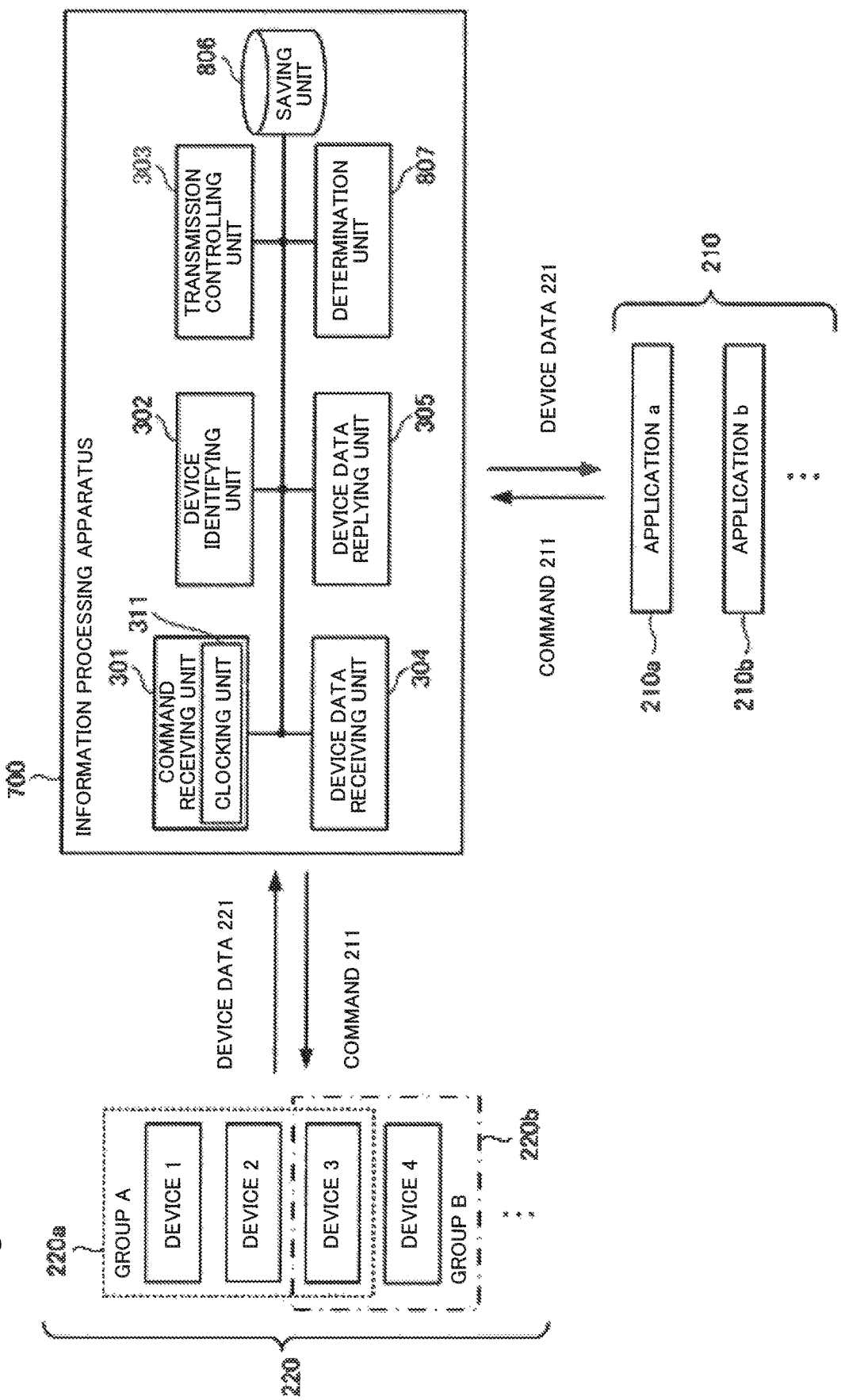

Fig. 9

| DEVICE ID | EXPIRATION DATE | BELONGING GROUP | TYPE OF DATA |
|---|---|---|---|
| DEVICE 1 | | A | TEMPERATURE HUMIDITY |
| DEVICE 2 | | A | TEMPERATURE |
| DEVICE 3 | | A, B | TEMPERATURE HUMIDITY |
| DEVICE 4 | | B | TEMPERATURE HUMIDITY |
| ⋮ | ⋮ | ⋮ | ⋮ |

Fig. 14

| 911 | 1411 | 912 | 913 | 914 |
|---|---|---|---|---|
| DEVICE ID | DATA TRANSMISSION POLICY | EXPIRATION DATE | BELONGING GROUP | DEVICE TYPE |
| DEVICE 1 | | | A | TEMPERATURE |
| DEVICE 2 | | | A | HUMIDITY |
| DEVICE 3 | | | A, B | |
| DEVICE 4 | ... | ... | B | ... |

| 911 | 1911 | 912 | 913 | 914 |
|---|---|---|---|---|
| DEVICE ID | FIRMWARE | EXPIRATION DATE | BELONGING GROUP | TYPE OF DATA |
| DEVICE 1 | | | A | TEMPERATURE HUMIDITY |
| DEVICE 2 | | | A | TEMPERATURE |
| DEVICE 3 | | | A, B | TEMPERATURE HUMIDITY |
| DEVICE 4 | | | B | TEMPERATURE HUMIDITY |
| ... | ... | ... | ... | ... |

1901

TRANSMISSION CONTROL PREVENTING TRANSMISSION OF SIMILAR COMMANDS IN OVERLAPPING MANNER

This application is a National Stage Entry of PCT/JP2017/006194 filed on Feb. 20, 2017, which claims priority from Japanese Patent Application 2016-035407 filed on Feb. 26, 2016, the contents of all of which are incorporated herein by reference, in their entirety.

TECHNICAL FIELD

The present invention relates to an information processing apparatus, an information processing method, an information processing program and an information processing system.

BACKGROUND ART

In the technical field above, Patent Literature 1 discloses an art for grouping devices and batch transmission. Patent Literature 2 discloses an art for removing noise based on metadata that are independent of the data.

CITATION LIST

Patent Literature

PTL 1: JP 5678094 B
PTL 2: WO2013/095773

SUMMARY OF INVENTION

Technical Problem

However, with the arts described in the literature above, for a device belonging to a plurality of groups, overlapped data transfer is necessary when data acquisition request is performed for each group. Thus, the congestion of the network band cannot be reduced.

The present invention is made in order to provide an art for solving the above-mentioned problems.

Solution to Problem

In order to solve the above problem, an information processing apparatus according to the present invention includes command receiving means for receiving a command for at least two device groups, the command supplied from at least one application; device identifying means for identifying a device that belongs to the at least two device groups when commands from the at least one application to the at least two device groups are commands of a similar type; and command transmission controlling means for controlling transmission in such a way not to transmit the commands of the similar type to the identified device in an overlapping manner.

In order to solve the above problem, an information processing method according to the present invention includes a command receiving step for receiving a command for at least two device groups, the command supplied from at least one application; a device identifying step for identifying a device that belongs to the at least two device groups when commands from the at least one application to the at least two device groups are commands of a similar type; and a command transmission controlling step for controlling transmission in such a way not to transmit the commands of the similar type to the identified device in an overlapping manner.

In order to solve the above problem, an information processing program causes a computer to perform: a command receiving step for receiving a command for at least two device groups, the command supplied from at least one application; a device identifying step for identifying a device that belongs to the at least two device groups when commands from the at least one application to the at least two device groups are commands of a similar type; and a command transmission controlling step for controlling transmission in such a way not to transmit the commands of the similar type to the identified device in an overlapping manner.

In order to solve the above problem, an information processing system according to the present invention includes: at least two device groups; and an information processing apparatus that processes information based on a command for the at least two device groups, the command supplied from at least one application; wherein the information processing apparatus comprises: command receiving means for receiving the command from the at least one application; device identifying means for identifying a device that belongs to the at least two device groups when the commands are commands of a similar type; and command transmission controlling means for controlling transmission in such a way not to transmit the commands of the similar type to the identified device in an overlapping manner.

Advantageous Effects of Invention

With the arts in the present invention, for a device belonging to a plurality of groups, an overlapping data transfer is not necessary when data acquisition is requested for each group. Thus, the congestion of the network band can be reduced.

BRIEF DESCRIPTION OF DRAWINGS

FIG. 1 is a block diagram illustrating a configuration of an information processing apparatus according to the first example embodiment of the present invention.

FIG. 3 is a block diagram illustrating a configuration of the information processing apparatus according to the second example embodiment of the present invention.

FIG. 7 is a sequence chart illustrating an overview of the processing by the information processing apparatus according to the third example embodiment of the present invention.

FIG. 8 is a block diagram illustrating a configuration of the information processing apparatus according to the third example embodiment of the present invention.

FIG. 9 is a diagram illustrating a configuration of the expiration date table included in the information processing apparatus according to the third example embodiment of the present invention.

FIG. 14 is a diagram illustrating a configuration of a data transmission policy setting table included in the information processing apparatus according to the fourth example embodiment of the present invention.

FIG. 19 is a diagram illustrating a configuration of a firmware table included in the information processing apparatus according to the fifth example embodiment of the present invention.

EXAMPLE EMBODIMENT

Figure 2A:
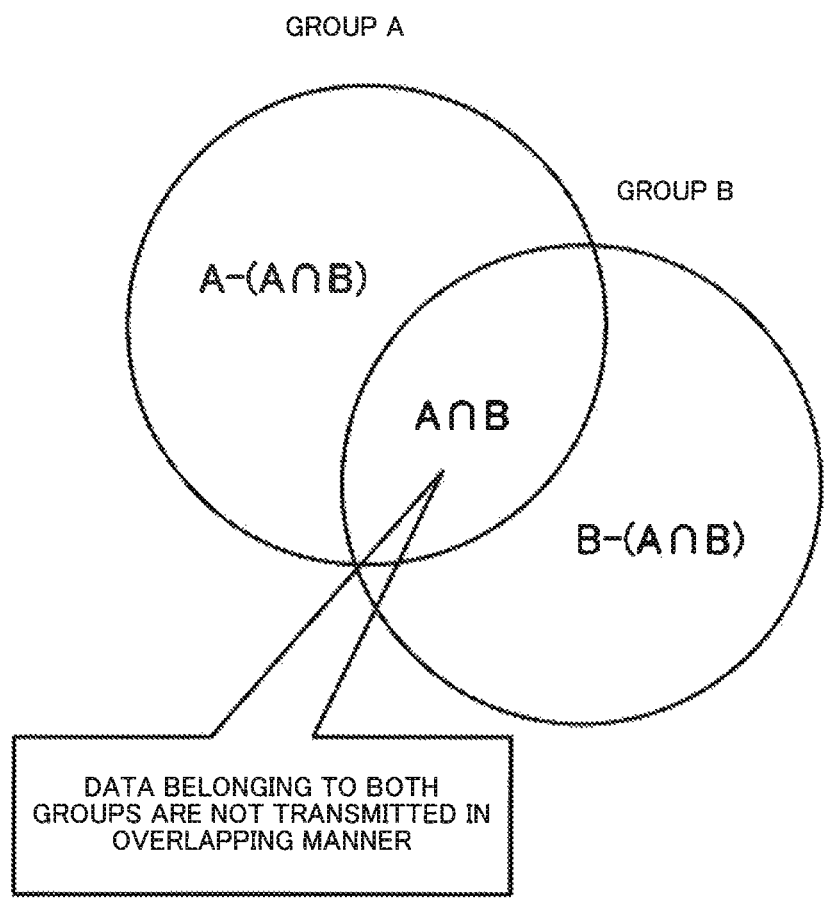
FIG. 2A is a diagram illustrating a concept of an operation of the information processing apparatus according to the second example embodiment of the present invention.

Hereinafter, with reference to the figures, the embodiments of the present invention are described in detail with examples. It should be noted that the configuration, numeral, process flow, function element described below in the embodiments are merely an example, and the deformation or modification thereof can be freely performed, and are not intended to limit the technical scope of the present invention.

First Example Embodiment

The information processing apparatus 100 as the first example embodiment of the present invention is described with reference to FIG. 1. The information processing apparatus 100 is an apparatus that collects data from devices included in a device group 120 based on a command 111 from an application 110, and replies with the collected device data to the application 110.

As illustrated in FIG. 1, the information processing apparatus 100 includes a command receiving unit 101, a device identifying unit 102 and a command transmission controlling unit 103.

The command receiving unit 101 receives a command 111 for at least two device groups 120. The command 111 is supplied from at least one application 110.

The device identifying unit 102 identifies a device that belongs to the at least two device groups 120 when the commands 111 supplied from the at least one application 110 to the at least two device groups 120 are the commands of a similar type 111.

The command transmission controlling unit 103 controls transmission in such a way not to transmit the commands of the similar type to the identified device in an overlapping manner.

With the example embodiment, for a device belonging to a plurality of groups, overlapping data transfer is not necessary when data acquisition request is performed for each group. Thus, the congestion of the network band can be reduced.

Second Example Embodiment

The information processing apparatus according to the second example embodiment of the present invention is described with reference to FIG. 2A to FIG. 6. FIG. 2A is a diagram illustrating a concept of an operation of the information processing apparatus according to the example embodiment. For example, when commands that are of the similar type are transmitted from a plurality of applications to devices that belong to group A and group B, for a device that belongs to both groups A and B, the commands overlap. As a result, the device data are transmitted from the device belonging to both groups A and B in an overlapping manner, and the congestion of the network band is generated. Note that the command that are of the similar type corresponds to a command that requests the similar type of operation to a device. For example, the commands that are the similar type include commands for requesting the transmission of similar kind of device data, and commands for requesting firmware update. The similar shall apply to the following example embodiments.

Thus, a device that belongs to a plurality of groups that are the target of the command transmission is detected when a plurality of commands for a group are transmitted to an information processing apparatus that manages a device group (for example, a common PF (Platform), GW (Gateway)). Then, the overlapping command transmission to the detected devices is suppressed.

Figure 2B:
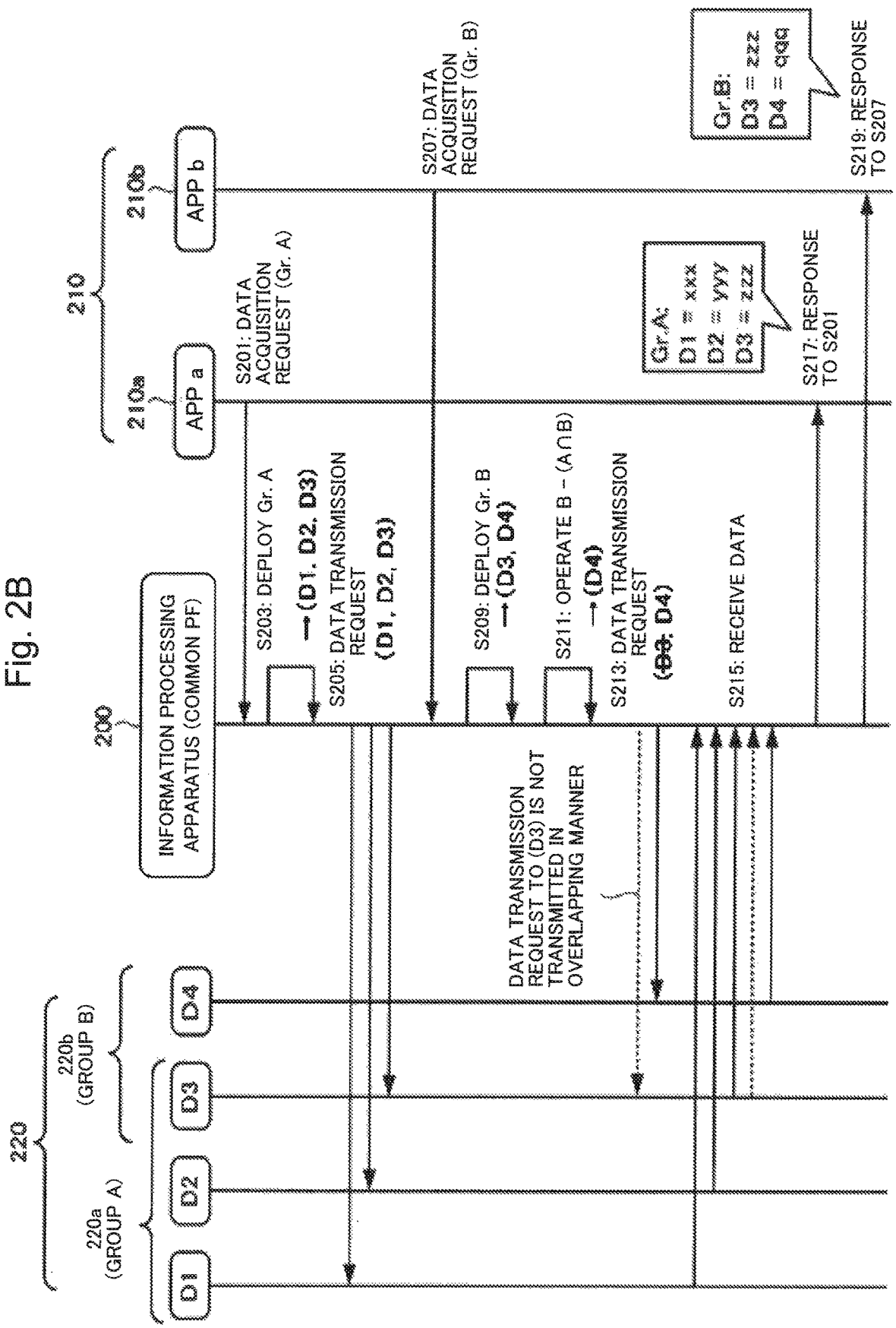
FIG. 2B is a sequence chart illustrating an overview of the operation of the information processing apparatus according to the second example embodiment of the present invention.

FIG. 2B is a sequence chart illustrating an overall operation of the information processing apparatus 200 according to the example embodiment. The information processing apparatus (common PF) 200 is coupled to the application 210 and the device group 220 via a network etc.

In step S201, the information processing apparatus 200 receives a data acquisition request that is a command from the application 210a (app a) to devices (D1 to D3) belonging to group a 220a (group A).

Then, in step S203, the information processing apparatus 200 deploys the group 220a based on the data acquisition request (command) from the application 210a in order to identify the device belonging to the group 220*a*. As a result, the information processing apparatus 200 identifies that the devices that belong to the group 220*a* are D1, D2 and D3.

In step S205, the information processing apparatus 200 transmits a data transmission request as a command to the devices (D1 to D3) belonging to the group 220*a* (group A).

In step S207, the information processing apparatus 200 receives a data acquisition request that is a command from an application 210*b* (app b) to the devices (D3 to D4) belonging to a group 220*b* (group B). Note that, the commands transmitted by the applications 210*a* and 210*b* are, but not limited to, commands of the similar type.

Then, in step S209, the information processing apparatus 200 deploys the group 220*b* based on the data acquisition request (command) from the application 210*b* in order to identify the device belonging to the group 220*b*. As a result, the information processing apparatus 200 identifies that the devices that belong to the group 220*b* are D3 and D4. The device D3 is a device that belongs to both the group 220*a* and group 220*b*, and is a device that belongs to a plurality of device groups 220 in an overlapping manner. Thus, when a command is transmitted, the command is transmitted to devices (D1, D2, D3, D3, D4), and an overlapping command is transmitted to the device D3. In step S211, the information processing apparatus 200 operates B−(A∩B) in such a way not to transmit an overlapping data transmission request (data acquisition request) to the device (D3) belonging to a plurality of device groups 220. The information processing apparatus 200 acquires D4 as a result of the operation.

In step S213, the information processing apparatus 200 transmits a data transmission request to the device (D4) belonging to the group 220*b*. That is to say, since the device (D3) belonging to both of the group 220*a* and group 220*b* is excluded from the target of transmitting commands, the data transmission request is not transmitted to the device (D3) in an overlapping manner.

In step S215, the information processing apparatus 200 receives device data from the devices (D1 to D4).

In step S217, the information processing apparatus 200 replies with the device data (xxx, yyy, zzz) of the devices (D1 to D3) to the application 210*a* as the response to step S201.

In step S219, the information processing apparatus 200 replies with the device data (zzz, qqq) of the devices (D3 to D4) to the application 210*b* as the response to step S207. In this manner, with the sequence chart of the FIG. 2B, an example that the device data are acquired from the device every time the application 210 performs the data acquisition request has been described.

Figure 2C:
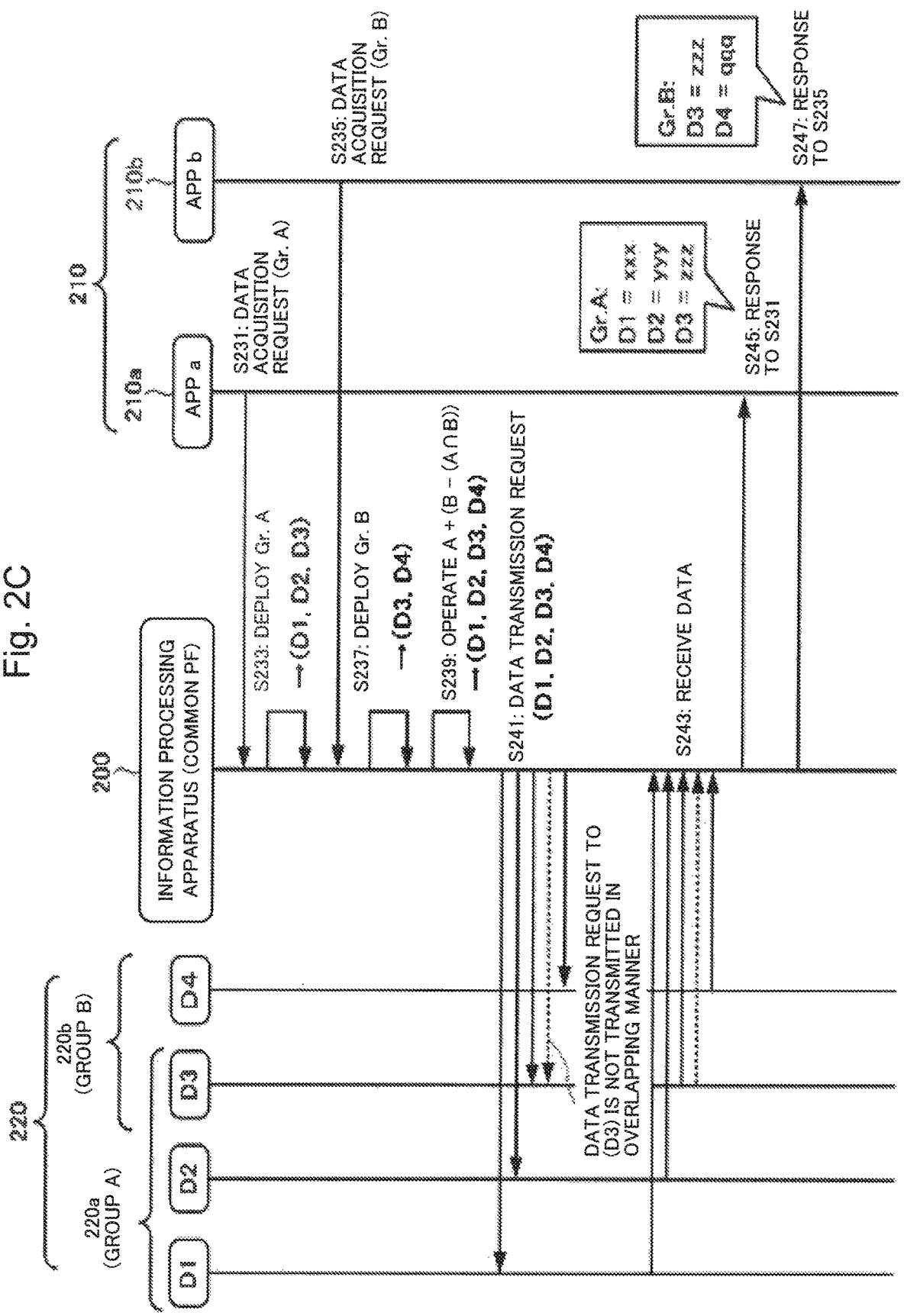
FIG. 2C is a sequence chart illustrating an overview of another operation of the information processing apparatus according to the second example embodiment of the present invention.

FIG. 2C is a sequence chart illustrating a concept of another operation of the information processing apparatus 200 according to the example embodiment, and is a sequence chart when a command from an application is a command that can accept delay.

In step S231, the information processing apparatus 200 receives a data acquisition request that is a command from the application 210*a* (app a) to the devices (D1 to D3) belonging to the group 220*a* (group A).

Then, in step S233, the information processing apparatus 200 deploys the group 220*a* based on the data acquisition request (command) from the application 210*a* in order to identify the devices belonging to the group 220*a*. As a result, the information processing apparatus 200 identifies that the devices that belong to the group 220*a* are D1, D2 and D3. The device D3 is a device that belongs to a plurality of device groups 220 (group 220*a* and group 220*b*).

The information processing apparatus 200 waits for the request (transmission of the command) from another application 210*b* (app b) for a predetermined period because the command from the application 210*a* is a command that can accept delay, and there is a device (D3) that belongs to other device groups in an overlapping manner.

Note that the information processing apparatus 200 may wait for a predetermined period for a request (transmission of a command) from another application 210 even when there is no device belonging to other device groups 220 in an overlapping manner.

In step S235, the information processing apparatus 200 receives a data acquisition request that is a command from the application 210*b* to the devices (D3 to D4) belonging to the group 220*b* (group B) within a predetermined period. Note that the commands transmitted by the application 210*a* and application 210*b* are, but not limited to, the commands of the similar type.

Then, in step S237, the information processing apparatus 200 deploys the group 220*b* based on the data acquisition request (command) from the application 220*b* in order to identify the devices that belong to the group b. As a result, the information processing apparatus 200 identifies that the devices that belong to the group 220*b* are D3 and D4. The device D3 is the device that belongs to both the group 220*a* and the group 220*b*, and is the device that belongs to a plurality of device groups 220 in an overlapping manner. Thus, when a command is transmitted, a command is transmitted to devices (D1, D2, D3, D3, D4), and an overlapping command is transmitted to the device D3.

In step S239, the information processing apparatus 200 operates B−(A∩B) in such a way not to transmit an overlapping data transmission request (data acquisition request) to the device (D3) belonging to a plurality of device groups 220. Then, the information processing apparatus 200 acquires (D1, D2, D3, D4) by combining the operation result and the deployment result of the group 220*a*.

In step S241, the information processing apparatus 200 transmits a data transmission request that is a command for the device group 220 to the devices (D1, D2, D3, D4). Here, the information processing apparatus 200 does not transmit the data transmission request to the device (D3) in an overlapping manner.

In step S243, the information processing apparatus 200 receives device data from each of the devices (D1 to D4).

In step S245, the information processing apparatus 200 replies with the device data (xxx, yyy, zzz) of the devices (D1 to D3) to the application 210*a* as the response to step S231. In step S247, the information processing apparatus 200 replies with the device data (zzz, qqq) of the devices (D3 to D4) to the application 210*b* as the response to step S235. In this manner, with the sequence chart of the FIG. 2C, the example that the device data are acquired by the device when the data acquisition requests from applications 210*a* and 210*b* arrive within the predetermined period has been described.

Note that, in the above description, the devices (D1 to D4) are coupled to one common PF (information processing apparatus 200), however, each of the devices may be coupled to a plurality of common PFs according to the content of the services. In addition, the groups the devices belong are not limited to two, but may be equal to or more than three. Moreover, a GW may be provided between the information processing apparatus 200 (common PF) and the device group 220. In this case, the operation of the information processing apparatus 200 may be changed, or may not be changed. That is to say, for example, the operation executed by the information processing apparatus 200 may be executed by the GW, or may be divided and executed by the information processing apparatus 200 and the GW.

FIG. 3 is a block diagram illustrating a configuration of the information processing apparatus 200 according to the example embodiment. The information processing apparatus 200 includes a command receiving unit 301, a device identifying unit 302, a command transmission controlling unit 303, a device data receiving unit 304, and a device data replying unit 305. The command receiving unit 301 includes a clocking unit 311.

The command receiving unit 301 receives a command 211 from the application 210. Application 210 includes a plurality of applications, and in the example embodiment, two applications that are the application 210*a* (app a) and application 210*b* (app b) are included, but the number of the applications is not limited to this.

The clocking unit 311 is a timer, and determines whether the plurality of commands 211 transmitted by the application 210 reached the command receiving unit 301 within a predetermined period or not. Then, when the plurality of commands 211 transmitted by the application 210 does not reach the command receiving unit 301 within the predetermined period, the information processing apparatus 200 processes each of the commands 211 individually, in the order of arrival.

The device identifying unit 302 identifies a device that belongs to the device group 220 based on the command 211 from the application 210 and received by the command receiving unit 301. For example, when a command 211 for the group 220*a* (group A) from the application 210*a* is received, the device identifying unit 302 identifies the device belonging to the group 220*a* (devices D1 to D3) by deploying the group 220*a*. Similarly, for example, when a command 211 for the group 220*b* (group B) from the application 210*a* is received, the device identifying unit 302 identifies the device belonging to the group 220*b* (devices D3 to D4) by deploying the group 220*b*.

The command transmission controlling unit 303 controls the transmission of the command 211, based on the information of the device group (device attribute) to which the device identified by the device identifying unit 302 belongs. Specifically, since the device (D3) belongs to both group 220*a* and group 220*b*, when the command 211 from the application 210 is transmitted, the command 211 for the device (D3) is transmitted in an overlapping manner.

As a result, the command transmission controlling unit 303 operates the intersection of the group 220*a* (group A) and the group 220*b* (group B). In other words, the command transmission controlling unit 303 determines the devices that belong to both the group 220*a* and the group 220*b*. Then, the command transmission controlling unit 303 suppresses the transmission of the overlapped command 211 in such a way not to transmit in an overlapping manner the command 211 to the device belonging to both groups.

Specifically, since the device belonging to group 220*a* (group A) and group 220*b* (group B) is the device (D3), among the commands 211, the transmission of the overlapping command 211 to the device (D3) is canceled. As a result, the overlapping command 211 for the device (D3) is not transmitted. Then, the command transmission controlling unit 303 transmits the data acquisition request to the devices (D1 to D4).

The device data receiving unit 304 receives the device data 221 from the devices belonging to group 220*a* (group A) and group 220*b* (group B). In other words, the device data 221 transmitted, addressed to the information processing apparatus 200, by the devices (D1 to D4) that received the data transmission request as a command 211 by executing the command 211, are received. In this case, since the overlapping command 211 is not transmitted to the device (D3), the number of times the device data 221 are transmitted by the device (D3) is one. Thus, the overlapping transmission of the device data 221 from the device group 220 is avoided, and the network band is not congested.

As a reply to the command 211, the device data replying unit 305 replies with the device data 221 received from the devices (D1 to D3) to the application 210*a*, and replies with the device data 221 received from the devices (D3 to D4) to the application 210*b*. In this case, the device data 221 of the device (D3) are not transmitted in an overlapping manner between the information processing apparatus 200 and the application 210, so the network band is not congested. Note that, in addition to replying with the device data 221 received from the device as they are to the application 210, the device data replying unit 305 calculates the average and the maximum values of the acquired device data 221, and replies with the values to the application 210. In other words, there is a case that the device data replying unit 305 replies with the result of applying some processing to the acquired device data.

Figure 4:
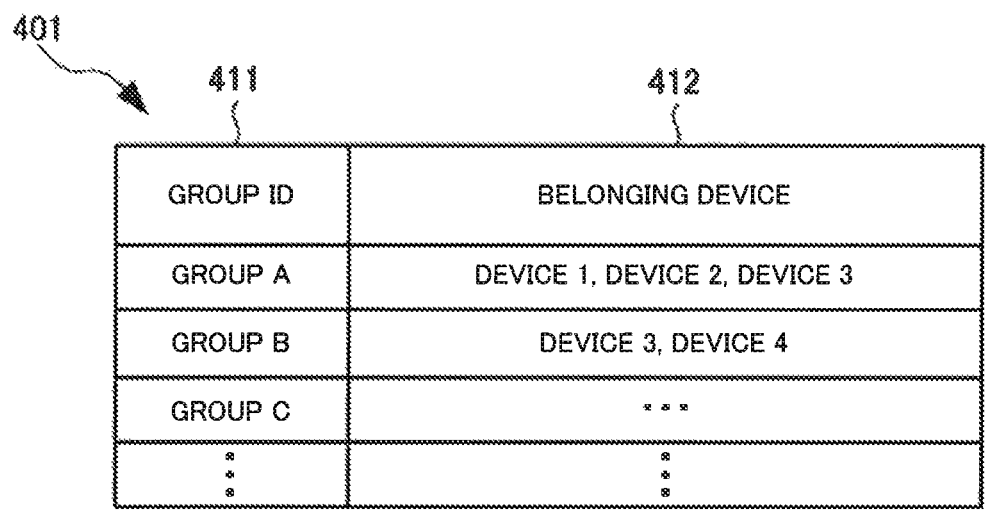
FIG. 4 is a diagram illustrating a configuration of a belonging device table included in the information processing apparatus according to the second example embodiment of the present invention.

FIG. 4 is a diagram illustrating a configuration of a belonging device table 401 included in the information processing apparatus 200 according to the example embodiment. The belonging device table 401 stores the belonging device 412 with an association to the group ID 411. The device identifying unit 302 refers to the belonging device table 401, and identifies a device that belongs to each group of the device group 220. Note that the method of identifying the devices that belong to the device group 220 by the device identifying unit 302 is not limited to the method of referring to the belonging device table 401, but may be a method to inquire the device about the belonging destination thereof.

Figure 5:
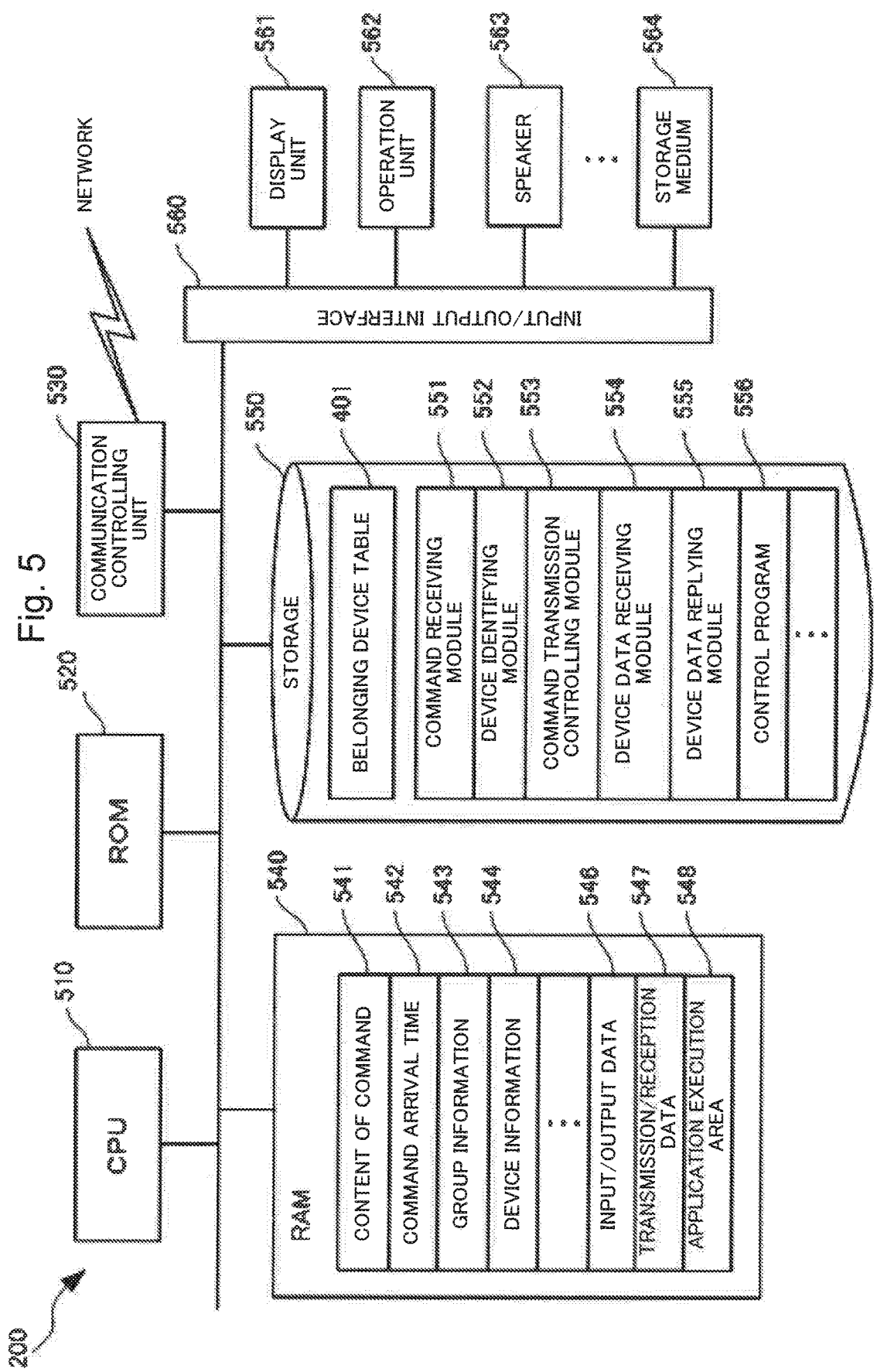
FIG. 5 is a block diagram illustrating a hardware configuration of the information processing apparatus according to the second example embodiment of the present invention.

FIG. 5 is a block diagram illustrating a hardware configuration of the information processing apparatus 200 according to the example embodiment.

A CPU (Central Processing Unit) 510 is a processor for computing control, and realizes the function configuration unit of the information processing apparatus 200 of FIG. 3, by executing a program. A ROM (Read Only Memory) 520 stores fixed data such as initial data and program, and program. A communication controlling unit 530 communicates with the application 210, device group 220, other apparatus and the like via a network. Note that the CPU 510 is not limited to one, but may be a plurality of CPUs, or may include a GPU (Graphics Processing Unit) for image processing. The communication controlling unit 530 desirably has a CPU independent from the CPU 510, and writes or reads transmission/reception data to/from an area of the RAM (Random Access Memory) 540. In addition, it is desirable that a DMAC (Direct Memory Access Controller) that transfers data between the RAM 540 and the storage 550 is provided (not illustrated). Moreover, the input/output interface 560 desirably has a CPU independent from the CPU 510, and writes or reads input/output data to/from an area of the RAM 540. Therefore, the CPU 510 processes data, having recognized that the data are received or transferred to the RAM 540. In addition, the CPU 510 prepares the processing result on the RAM 540, and leaves the remaining transmission or transfer to the communication controlling unit 530, DMAC, or the input/output interface 560.

The RAM 540 is a random access memory that the CPU 510 uses as a work area for temporary storage. An area for storing necessary data for realizing the example embodiment is secured in the RAM 540. The content of the command 541 is the content of the command 211 that is transmitted from the application 210 to the device group 220, and is a data acquisition request, for example. Command arrival time 542 is the time the command 211 from the application 210 arrived at the command receiving unit 301 of the information processing apparatus 200. The arrival time is marked on the command 211 by the clocking unit 311, for example. Then, the command receiving unit 301 determines whether the plurality of commands 211 transmitted by the application 210 reached within the predetermined period, based on the time marked on the command or not.

Group information 543 is a piece of information about the device group 220 to which the device that is the target of the transmission of the command 211 belongs, and is a piece of information deployed from the belonging device table 401 illustrated in FIG. 4. Device information 544 is a piece of information related to the device that is the target of transmission of the command 211, and is, but not limited to, a piece of information such as a device ID or a device type, for example. The input/output data 546 are the data input/output via the input/output interface 560. The transmission/reception data 547 are the data transmitted/received via communication controlling unit 530. The RAM 540 has an application execution area 548 for executing various application modules.

The storage 550 is stored with databases, various parameters, or the following data or program for realizing the example embodiment. The storage 550 stores the belonging device table 401. The belonging device table 401 is a table that manages the relationship between the device group 220 (group ID) and the devices belonging to the group, illustrated in FIG. 4.

The storage 550 stores a command receiving module 551, a device identifying module 552, a command transmission controlling module 553, device data receiving module 554, and a device data replying module 555.

The command receiving module 551 is a module that receives a plurality of commands from the application 210, and is a module that determines whether the plurality of commands arrived within a predetermined period or not. The device identifying module 552 is a module that identifies a device that belongs to the device group 220 when the plurality of commands 211 from the application 210 arrived within a predetermined period. The command transmission controlling module 553 is a module that controls a transmission of the command 211 in such a way not to transmit an overlapped command 211 to a device belonging to a plurality of device groups 220. The device data receiving module 554 is a module that receives device data 221 of each device transmitted from the device group 220. The device data replying module 555 is a module that replies, as the reply to the command 211 from the application 210, with the received device data 221 to the application 210 that transmitted the command 211. These modules 551 to 555 are read out by the CPU 510 to the application execution area 548 of the RAM 540, and are executed. The control program 556 is a program for wholly controlling the information processing apparatus 200.

The input/output interface 560 interfaces the input/output data with the input/output devices. A display unit 561, an operation unit 562 are coupled to the input/output interface 560. Further, a storage medium 564 may also be coupled to the input/output interface 560. Moreover, a speaker 563 that is a sound outputting unit, a microphone that is a sound inputting unit, or a GPS position determination unit may be coupled. Note that, in the RAM 540 and storage 550 illustrated in FIG. 5, the program and data related to general functions of the information processing apparatus 200 or other functions that can be realized are not illustrated.

Figure 6A:
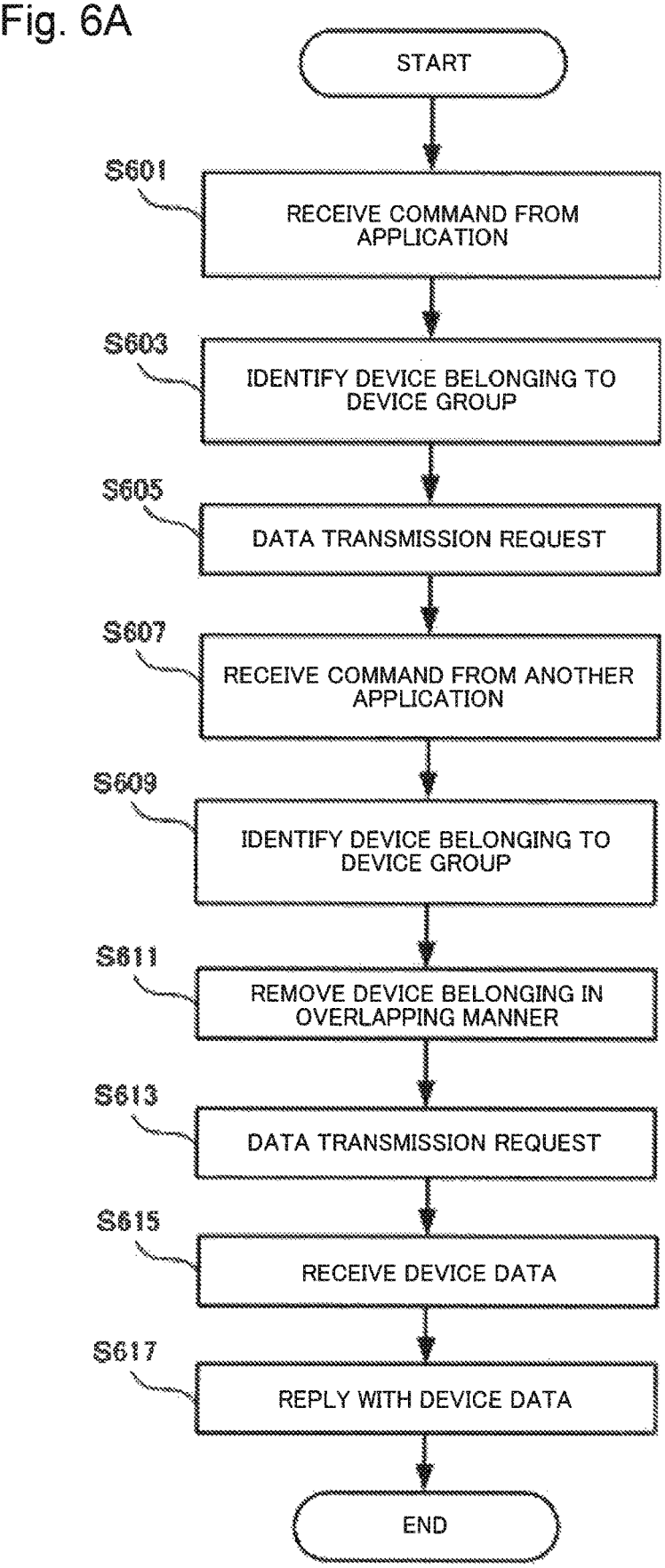
FIG. 6A is a flow chart illustrating a processing procedure of the information processing apparatus according to the second example embodiment of the present invention.

FIG. 6A is a flow chart illustrating a processing procedure of the information processing apparatus 200 according to the example embodiment, and is a flow chart corresponding to the sequence chart of FIG. 2B. This flow chart is executed by the CPU 510 of FIG. 5 by using the RAM 540, and the function configuration unit of the information processing apparatus 200 of the FIG. 3 is realized.

In step S601, the information processing apparatus 200 receives a command 211 such as a data acquisition request from the application 210a. In step S603, the information processing apparatus 200 identifies devices (D1 to D3) that belong to the group 220a that is the transmission destination of the command 211, based on the received command 211. In step S605, the information processing apparatus 200 transmits a data transmission request to the identified devices as a command 211.

In step S607, the information processing apparatus 200 receives a command 211 such as a data acquisition request from another application 210b. In step S609, the information processing apparatus 200 identifies devices (D3 to D4) that belong to the group 220b that is the transmission destination of the command 211, based on the received command 211. In step S611, the device (D3) that belongs to the group 220a and the group 220b in an overlapping manner is removed from the transmission destination of the command 211. In step S613, the information processing apparatus 200 transmits a data transmission request to the device (D4) as a command 211.

In step S615, the information processing apparatus receives device data 221 from the devices (D1 to D4). In step S617, the information processing apparatus 200 replies with the device data 221 to the application 210a and the application 210b.

Figure 6B:
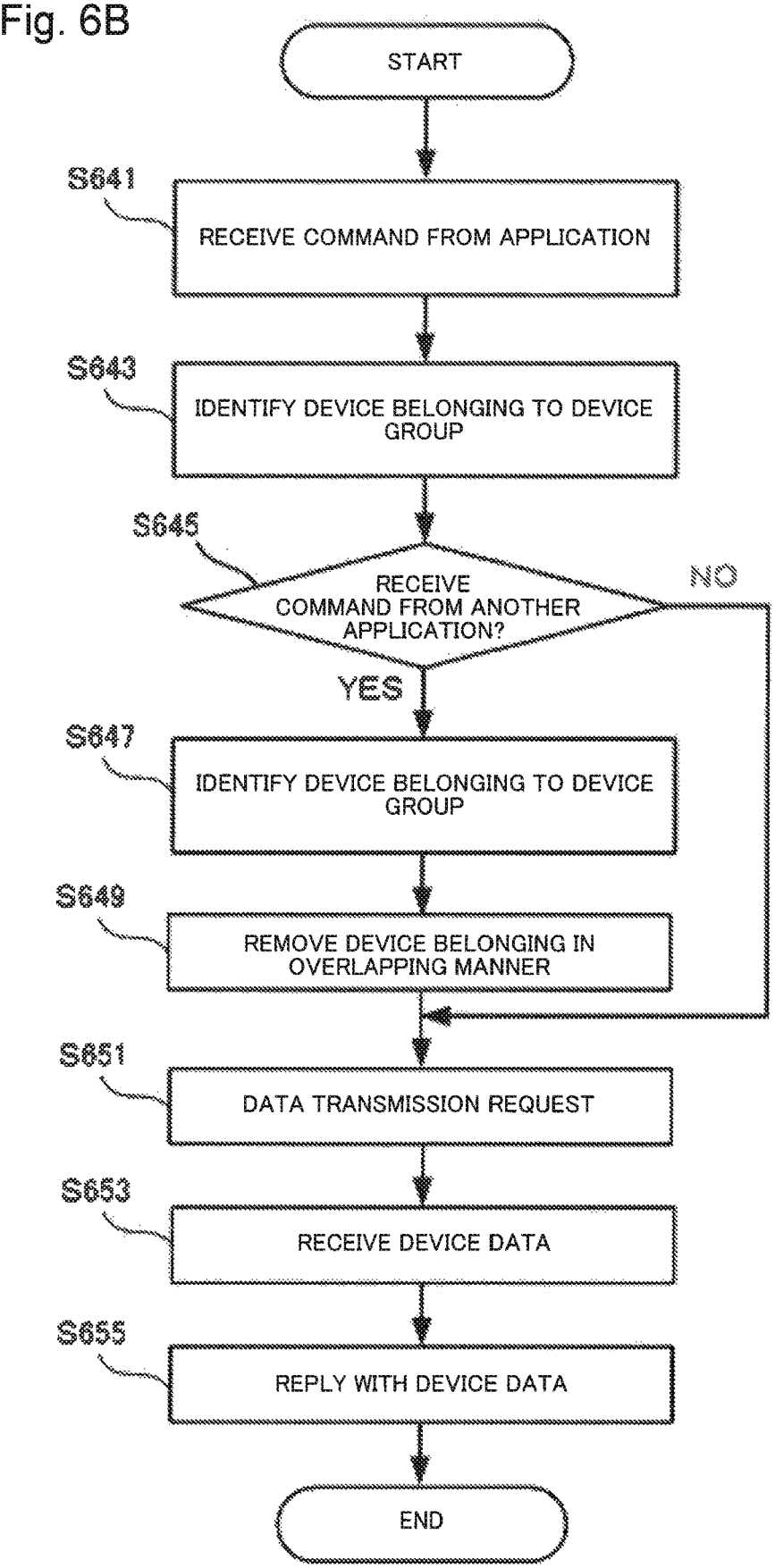
FIG. 6B is a flow chart illustrating another processing procedure by the information processing apparatus according to the second example embodiment of the present invention.

FIG. 6B is a flow chart illustrating another processing procedure of the information processing apparatus 200 according to the example embodiment, and is a flow chart corresponding to the sequence chart of FIG. 2C. This flow chart is executed by the CPU 510 of FIG. 5 by using the RAM 540, and the function configuration unit of the information processing apparatus 200 of the FIG. 3 is realized.

In step S641, the information processing apparatus 200 receives a command 211 such as a data acquisition request from the application 210a. In step S643, the information processing apparatus 200 identifies devices (D1 to D3) that belong to the group 220a that is the transmission destination of the command 211, based on the received command 211. In step S645, the information processing apparatus 200 determines whether a command 211 such as a data acquisition request is received from another application 210b within a predetermined period or not. When the command 211 is not received from another application 210b within a predetermined period (NO in step S645), the information processing apparatus 200 proceeds to step S651, and transmits a data transmission request to the devices (D1 to D3). When the command 211 is received from another application 210b within a predetermined period (YES in step S645), the information processing apparatus 200 proceeds to step S647.

In step S647, the information processing apparatus 200 identifies devices (D3 to D4) that belong to the group 220b that is the transmission destination of the command 211, based on the received command 211 from another application 210b. In step S649, the information processing apparatus 200 removes the device (D3) that belongs to the group 220a and the group 220b in an overlapping manner from the transmission destination of the command 211. In step S651, the information processing apparatus 200 transmits a data transmission request to the devices (D1 to D4) as a command 211.

In step S653, the information processing apparatus 200 receives device data 221 from the devices (D1 to D4). In step S655, the information processing apparatus 200 replies with the device data 221 to the application 210a and the application 210b.

With the example embodiment, for a device belonging to a plurality of groups, overlapped data transmission is not necessary when data acquisition request is performed for each group. Thus, the congestion of the network band can be reduced. In addition, since the command is transmitted after removing overlap when the plurality of commands arrive within a predetermined period, when seen from the application, the response immediacy is not impaired.

Third Example Embodiment

The information processing apparatus according to the third example embodiment of the present invention is described with reference to FIG. 7 to FIG. 11. FIG. 7 is a sequence chart illustrating an overall operation of the information processing apparatus according to the example embodiment. The information processing apparatus according to the example embodiment is different in that having a saving unit that temporarily saves the acquired device data and a determination unit that determines the expiration date of the saved device data, compared to the above-described second example embodiment. Other configuration and operation are similar to that of the second example embodiment, thus like reference numerals are used to the similar configuration and operation, and the detailed descriptions thereof are omitted.

In step S701, the information processing apparatus 700 receives a data acquisition request as a command from the application 210a (app a) to group 220a (group A). In step S703, the information processing apparatus 700 deploys the group 220a based on the data acquisition request from the application 210a in order to identify the device belonging to the group 220a. As a result, the information processing apparatus 700 identifies that the devices that belong to the group 220a are D1, D2 and D3.

In step S705, the information processing apparatus 700 transmits a data transmission request as a command to the devices (D1 to D3) belonging to the group 220a (group A).

In step S707, the information processing apparatus 700 receives device data from the devices (D1 to D3). Then, in step S709, the information processing apparatus 700 caches and temporarily saves the received device data of the devices (D1 to D3). In step S711, the information processing apparatus 700 replies with the device data (D1=xxx, D2=yyy, D3=zzz) of the devices (D1 to D3) to the application 210a as the response to the step S701.

In step S713, the information processing apparatus 700 receives a data acquisition request that is a command from the application 210b (app b) to group 220b (group B). In step S715, the information processing apparatus 700 deploys the group 220b based on the data acquisition request from the application 210b in order to identify the device belonging to the group 220b. As a result, the information processing apparatus 700 identifies that the devices that belong to the group 220b are D3 and D4. Moreover, it is also identified that the device (D3) belongs to both the group 220a and the group 220b in an overlapping manner.

In step S717, whether the cache of the device data temporarily saved in step S709 is within the expiration date or not is determined. When the expiration date is not expired, the information processing apparatus 700 operates B−(A∩B). The information processing apparatus 700 acquires D4 as a result of the operation. Then, in step S719, the information processing apparatus 700 transmits a data transmission request to the device (D4) belonging to the group 220b. That is to say, the device (D3) belonging to both the group 220a and the group 220b is excluded from the target of transmitting data transmission request, so the data transmission request is not transmitted to the device (D3) in an overlapping manner.

In step S721, the information processing apparatus 700 receives device data from the device (D4). In step S723, the information processing apparatus 700 caches and temporarily saves the acquired device data of the device (D4). In step S725, the information processing apparatus 700 configures the device data of the group 220b from the device data of the device (D3) cached in step S709 and the device data of the device (D4) received in step S721. In step S727, the information processing apparatus 700 replies with the device data (D3=zzz, D4=qqq) of the devices (D3 to D4) to the application 210b as the response to step S713.

FIG. 8 is a block diagram illustrating a configuration of the information processing apparatus 700 according to the example embodiment. The information processing apparatus 700 further includes a saving unit 806 and a determination unit 807. The saving unit 806 caches and temporarily saves the device data 221. The determination unit 807 determines whether the device data 221 saved in the saving unit 806 are within the expiration date or not.

FIG. 9 is a diagram illustrating an example of a configuration of an expiration date table 901 included in the information processing apparatus 700 according to the example embodiment. The expiration date table 901 stores an expiration date 912, a belonging group 913, and a device type 914, in a manner in which they are related to the device ID 911. Note that the item stored in the expiration date table 901 is not limited to the above. The determination unit 807 determines whether the expiration date of the device data 221 temporarily saved in the saving unit 806 has expired or not, by referring to the expiration date table 901. Note that, when a plurality of types of data 914 related to one device exist (temperature and humidity in FIG. 9), the expiration date may be set respectively, or one expiration date may be collectively set. Alternatively, when number of the types of data acquired by each device is one, the data type 914 may be omitted.

Figure 10:
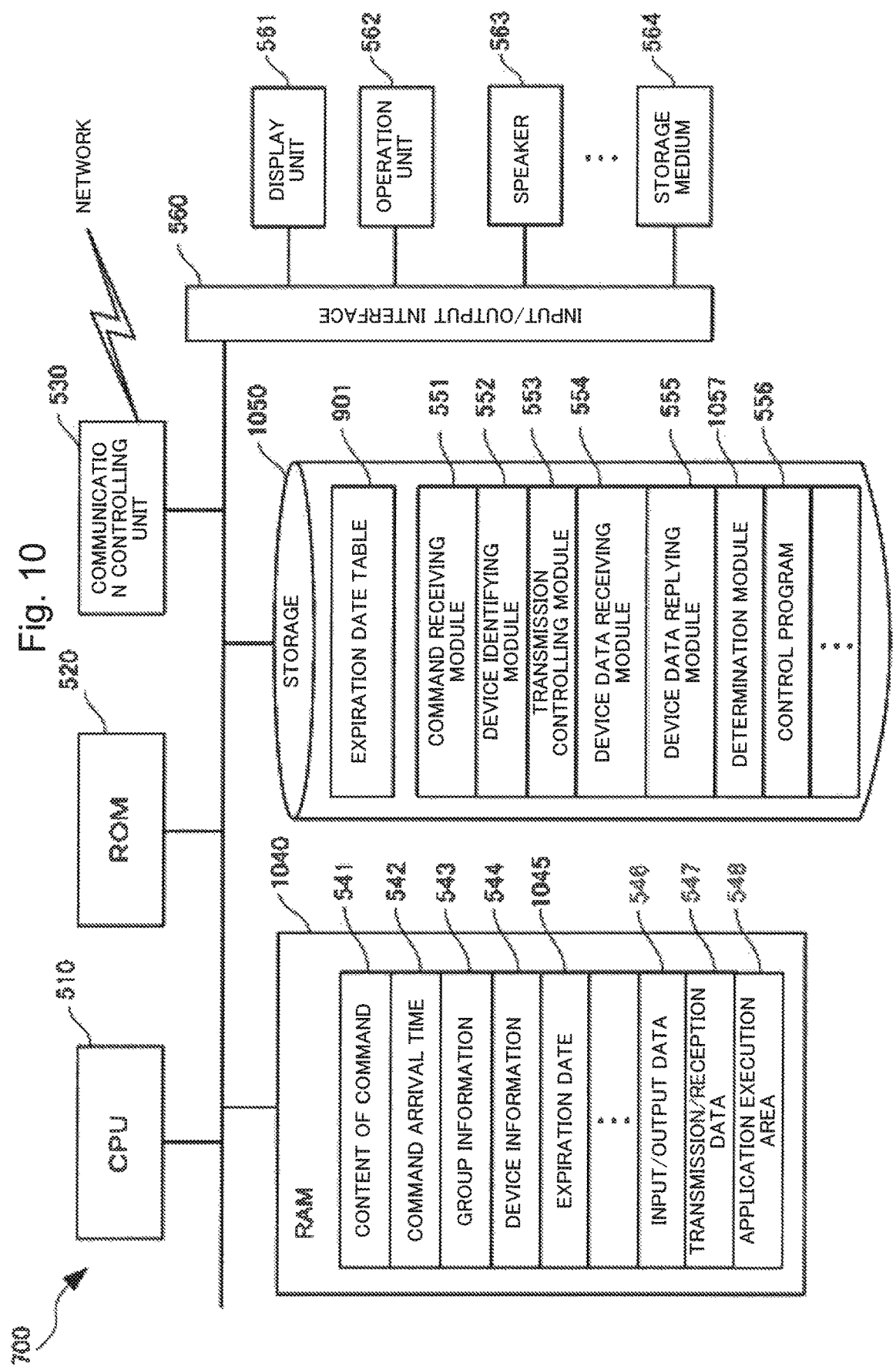
FIG. 10 is a block diagram illustrating a hardware configuration of the information processing apparatus according to the third example embodiment of the present invention.

FIG. 10 is a block diagram illustrating a hardware configuration of the information processing apparatus 700 according to the example embodiment. A RAM 1040 is a random access memory that the CPU 510 uses as a work area for temporary storage. An area for storing necessary data for realizing the example embodiment is secured in the RAM 1040. An expiration date 1045 is a piece of information related to the expiration date of the device data 221 that are temporarily saved in the saving unit 806, and is temporarily stored in the RAM 1040. The expiration date 1045 may be read out to the RAM 1040 from a database storing an expiration date and the like that is not illustrated.

In the storage 1050, databases, various parameters, or the following data or program for realizing the example embodiment are stored. An expiration date table 901 is a table with the configuration illustrated in the FIG. 9, and is stored in the storage 1050.

The storage 1050 further stores a determination module 1057. The determination module 1057 is a module that determines whether the device data 221 saved in the saving unit 806 are within the expiration date or not. This module 1057 is read out to the application execution area 548 of the RAM 1040 by the CPU 510, and is executed.

Figure 11:
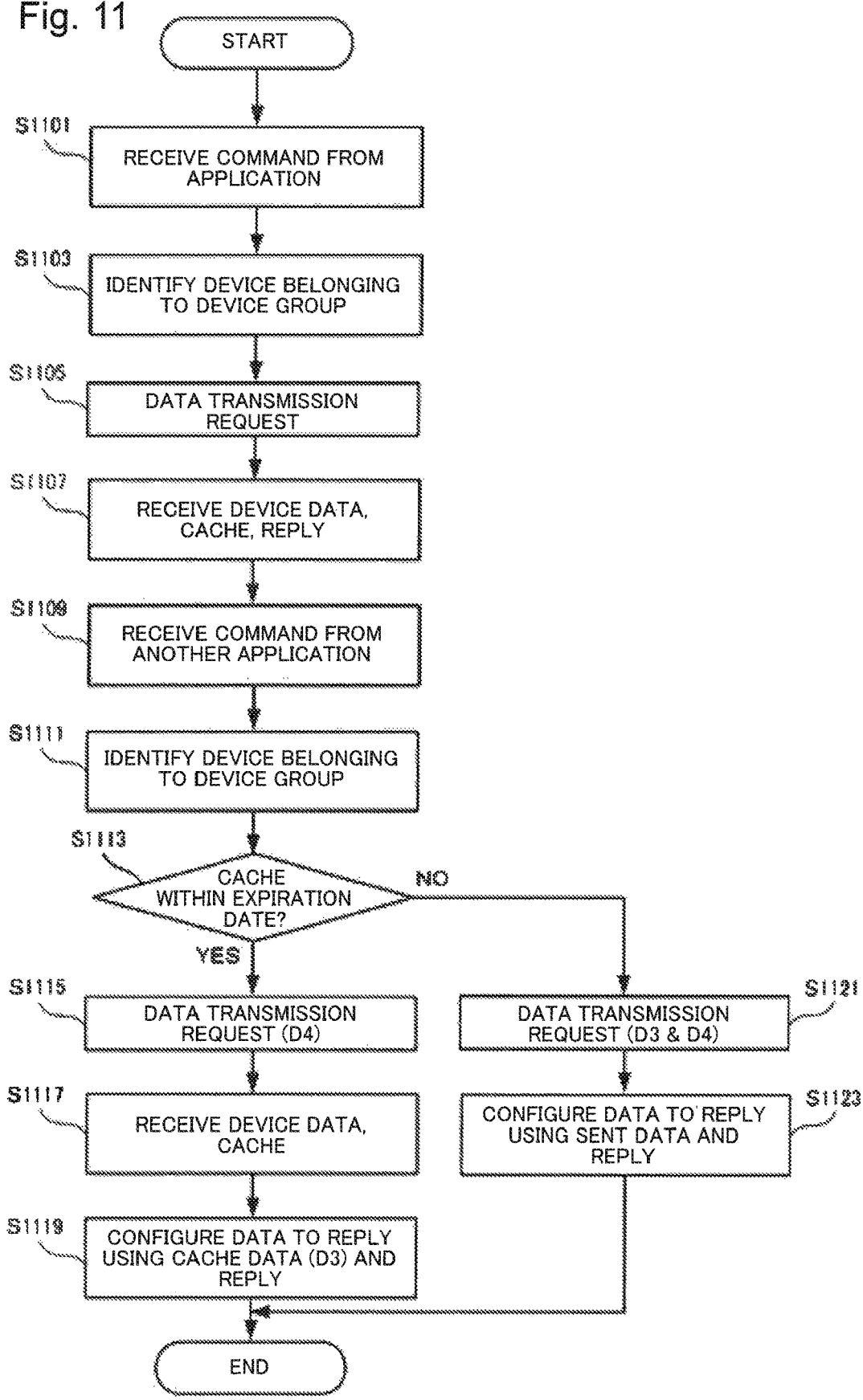
FIG. 11 is a flow chart illustrating a processing procedure of the information processing apparatus according to the third example embodiment of the present invention.

FIG. 11 is a flow chart illustrating a processing procedure of the information processing apparatus 700 according to the example embodiment. This flow chart is executed by the CPU 510 of FIG. 10 by using the RAM 1040, and the function configuration unit of the information processing apparatus 700 of the FIG. 8 is realized.

In step S1101, the information processing apparatus 700 receives a command 211 such as a data acquisition request from the application 210*a*. In step S1103, the information processing apparatus 700 identifies devices (D1 to D3) that belong to the group 220*a* that is the transmission destination of the command 211, based on the received command 211. In step S1105, the information processing apparatus 700 transmits a data transmission request to the identified devices as a command 211.

In step S1107, the information processing apparatus 700 receives the device data 221 from the devices (D1 to D3), and temporarily saves in the saving unit 806. Then, the information processing apparatus 700 replies with the received device data 221 to the application 210*a* as the response to the data acquisition request.

In step S1109, the information processing apparatus 700 receives a command 211 such as a data acquisition request from another application 210*b*. In step S1111, the information processing apparatus 700 identifies devices (D3 to D4) that belong to the group 220*b* that is the transmission destination of the command 211, based on the received command 211. In step S1113, the information processing apparatus 700 determines whether the device data 221 of the device (D3) that are temporarily saved in the saving unit 806 as a cache are within the expiration date or not.

When the device data 221 are within the expiration date (YES in step S1113), the information processing apparatus 700 proceeds to step S1115. In step S1115, the information processing apparatus 700 transmits a data transmission request to the device (D4). In step S1117, the information processing apparatus 700 receives the device data 221 from the device (D4), and temporarily saves the received device data 221 in the saving unit 806 as a cache.

In step S1119, the information processing apparatus 700 configures the data to reply to the application 210*b*, using the device data 221 of the device (D3) that are saved in the saving unit 806 as a cache and the device data 221 received from the device (D4). When the data to reply are configured, the information processing apparatus 700 replies to the application 210*b* with the device data 221 of the devices (D3 to D4).

When the device data 221 are not within the expiration date (NO in step S1113), the information processing apparatus 700 proceeds to step S1121. In step S1121, the information processing apparatus 700 transmits a data transmission request to the devices (D3 to D4). In step S1123, the information processing apparatus 700 configures the data to reply to the application 210*b*, using the device data 221 that are transmitted from the devices (D3 to D4). When the data to reply are configured, the information processing apparatus 700 replies to the application 210*b* with the device data 221 of the devices (D3 to D4).

With the example embodiment, for a device belonging to a plurality of groups, an overlapping data transfer is not necessary when data acquisition request is performed for each group. Thus, the congestion of the network band can be reduced. Further, since the device data 221 are temporarily saved as a cache, and the expiration date of the saved device data 221 is determined, the congestion of the network band is further reduced.

Fourth Example Embodiment

Figure 12:
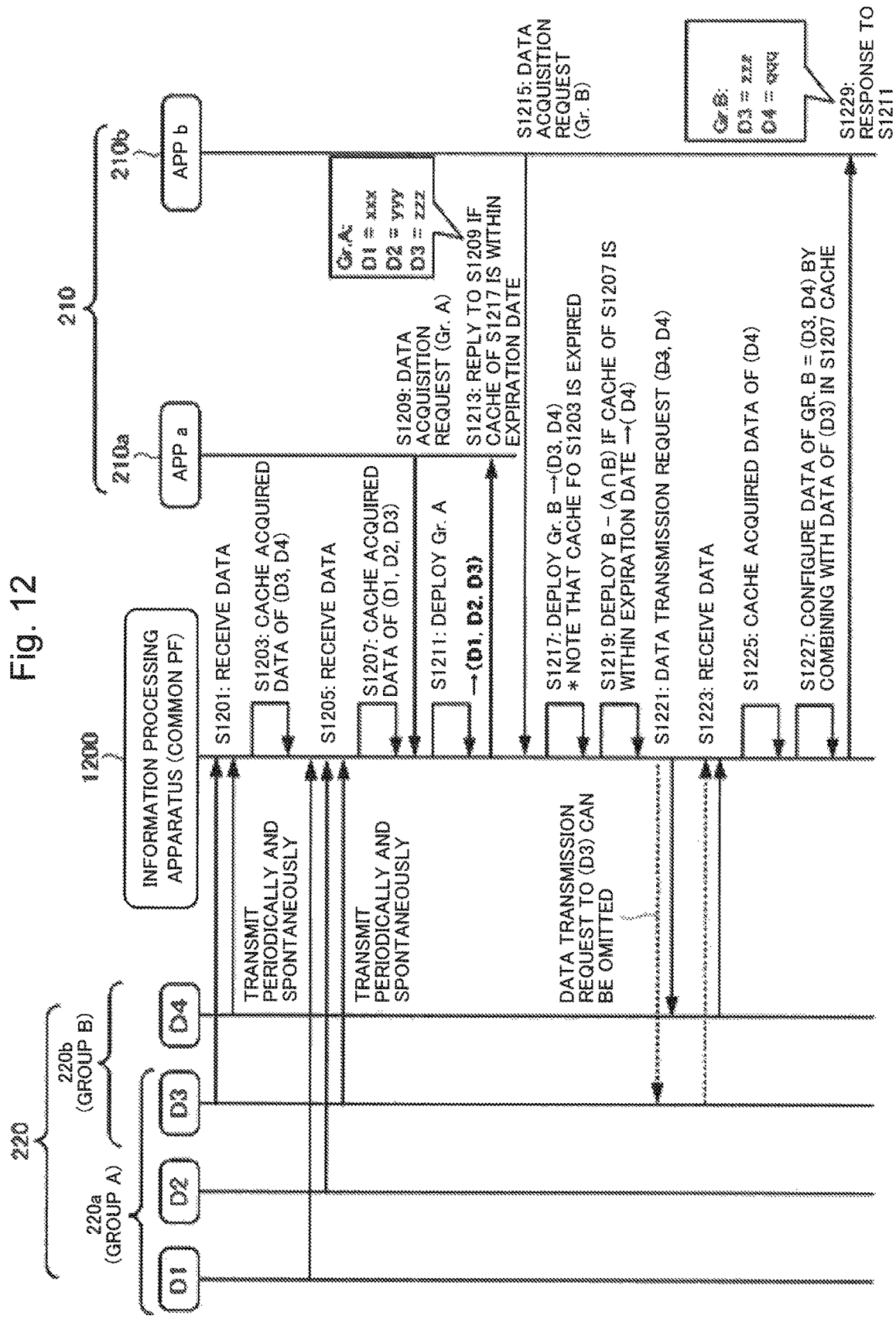
FIG. 12 is a sequence chart illustrating an overview of a processing by the information processing apparatus according to the fourth example embodiment of the present invention.

The information processing apparatus according to the fourth example embodiment of the present invention is described with reference to FIG. 12 to FIG. 16. FIG. 12 is a sequence chart illustrating an overall operation of the information processing apparatus according to the example embodiment. The information processing apparatus according to the example embodiment is different in that the device transmits device data spontaneously and periodically, compared to the above-described second example embodiment and the third example embodiment. Other configuration and operation are similar to that of the second example embodiment and the third example embodiment, thus similar reference numerals are used to the similar configuration and operation, and the detailed descriptions thereof are omitted.

FIG. 12 is a sequence chart illustrating an overall processing of the information processing apparatus 1200 according to the example embodiment. A data transmission policy is set to devices (D1 to D4). The data transmission policy is set to the devices (D1 to D4) by the application 210 and the like. However, the method of setting the data transmission policy is not limited to this. For example, the common PF or GW or the like may set a data transmission policy to devices (D1 to D4).

In step S1201, the information processing apparatus 1200 receives device data that are transmitted spontaneously and periodically from the devices (D3 to D4) that belong to the group 220*b* (group B) based on the data transmission policy. In step S1203, the information processing apparatus 1200 temporarily saves the received and acquired device data of the devices (D3 to D4) as a cache.

In step S1205, the information processing apparatus 1200 receives device data that are transmitted spontaneously and periodically from the devices (D1 to D3) that belong to the group 220*a* (group A) based on the data transmission policy. Then, in step S1207, the information processing apparatus 1200 temporarily saves the device data of the devices (D1 to D3) received and acquired from the group 220*a* as a cache.

In step S1209, the information processing apparatus 1200 receives a data acquisition request that is a command to group 220*a* (group A) from the application 210*a* (app a). In step S1211, the information processing apparatus 1200 deploys the group 220*a* based on the data acquisition request from the application 210*a* in order to identify the device belonging to the group 220*a*. As a result, the information processing apparatus 1200 identifies that the devices that belong to the group 220*a* are D1, D2 and D3.

In step S1213, the information processing apparatus 1200 determines whether the device data cached at step S1207 are within the expiration date or not. Then, when the cached device data are within the expiration date, the information processing apparatus 1200 transmits the cached device data as the response to step S1209. That is, the information processing apparatus 1200 replies with the device data (D1=xxx, D2=yyy, D3=zzz) of the devices (D1 to D3) to the application 210*a*.

In step S1215, the information processing apparatus 1200 receives a data acquisition request that is a command from the application 210b (app b) to group 220b (group B). In step S1217, the information processing apparatus 1200 deploys the group 220b based on the data acquisition request from the application 210b in order to identify the device belonging to the group 220b. Here, in step S1215, the expiration date of the device data cached in step S1203 are expired.

In step S1219, when the device data cached in step S1207 are within the expiration date, the information processing apparatus 1200 operates B−(A∩B) and acquires the device (D4) as the operation result. In step S1221, the information processing apparatus 1200 transmits a data transmission request to the device (D4) belonging to the group 220b as a command. In step S1223, the information processing apparatus 1200 receives device data from the device (D4). In step S1225, the information processing apparatus 1200 temporarily saves device data of the device (D4) received and acquired from the device (D4) as a cache. In step 1227, the information processing apparatus 1200 configures the data to reply to the application 210b, using the device data that are transmitted from the device (D4) and the cached device data of the device (D3). Then, in step S1229, the device data (D3=zzz, D4=qqq) of the devices (D3 to D4) are replied to the application 210b as the response to step S1211.

Figure 13:
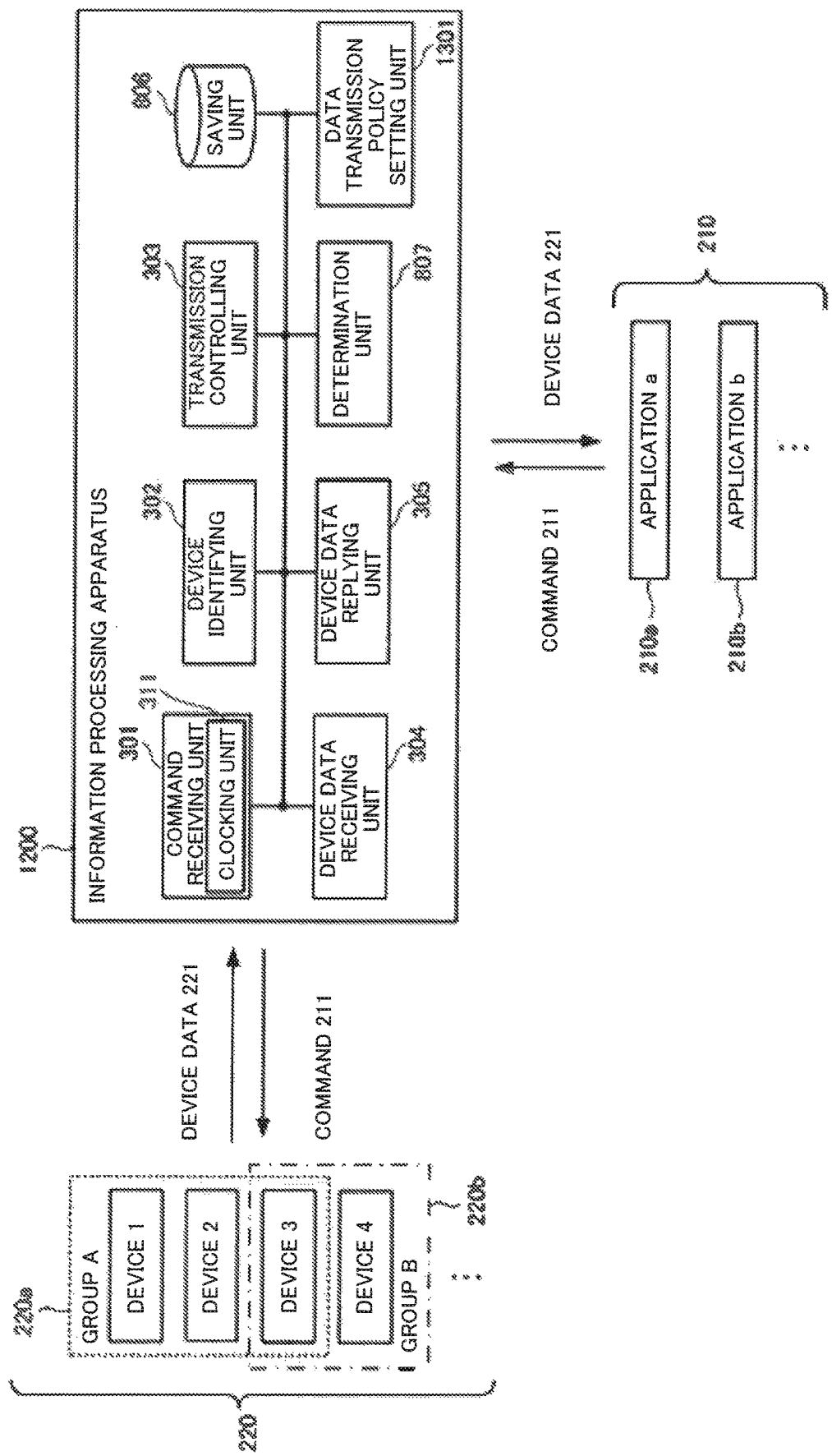
FIG. 13 is a block diagram illustrating a configuration of the information processing apparatus according to the fourth example embodiment of the present invention.

FIG. 13 is a block diagram illustrating a configuration of the information processing apparatus 1200 according to the example embodiment. The information processing apparatus 1200 further includes a data transmission policy setting unit 1301. The data transmission policy setting unit 1301 sets a data transmission policy to a device. The device transmits device data 221 to the information processing apparatus 1200 periodically and spontaneously, in accordance with the data transmission policy that is set.

FIG. 14 is a diagram illustrating a configuration of a data transmission policy setting table 1401 included in the information processing apparatus according to the example embodiment. The data transmission policy setting table 1401 stores a data transmission policy 1411 with a relation to a device ID 911. The data transmission policy setting unit 1301 sets a data transmission policy to a device, referring to the data transmission policy setting table 1401. Note that the setting method of the data transmission policy is not limited to the above.

Figure 15:
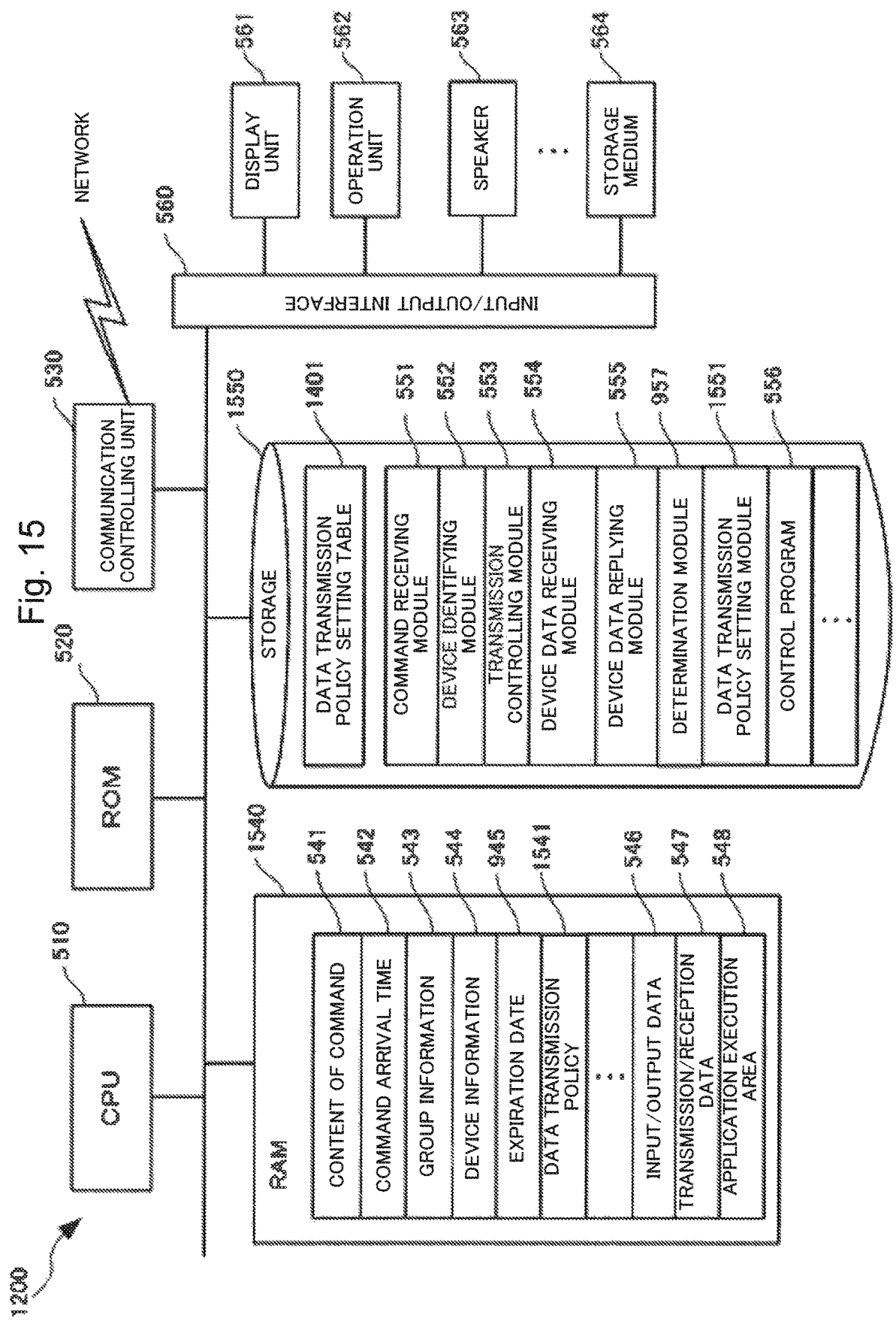
FIG. 15 is a block diagram illustrating a hardware configuration of the information processing apparatus according to the fourth example embodiment of the present invention.

FIG. 15 is a block diagram illustrating a hardware configuration of the information processing apparatus 1200 according to the example embodiment. A RAM 1540 is a random access memory that the CPU 510 uses as a work area for temporary storage. An area for storing necessary data for realizing the example embodiment is secured in the RAM 1540. The data transmission policy 1541 is a piece of information that is related to the data transmission policy of the device, and is temporarily stored in the RAM 1540. The data transmission policy 1541 may be read out to the RAM 1540 from a database and the like storing a data transmission policy that is not illustrated.

In the storage 1550, databases, various parameters, or the following data or program necessary for realizing the example embodiment are stored. The data transmission policy setting table 1401 is a table with the configuration illustrated in the FIG. 14, and is stored in the storage 1550. The storage 1550 further stores a data transmission policy setting module 1551. The data transmission policy setting module 1551 is a module that sets a data transmission policy of a device. This module 1551 is read out by the CPU 510 to the application execution area 548 of the RAM 1540, and is executed.

Figure 16:
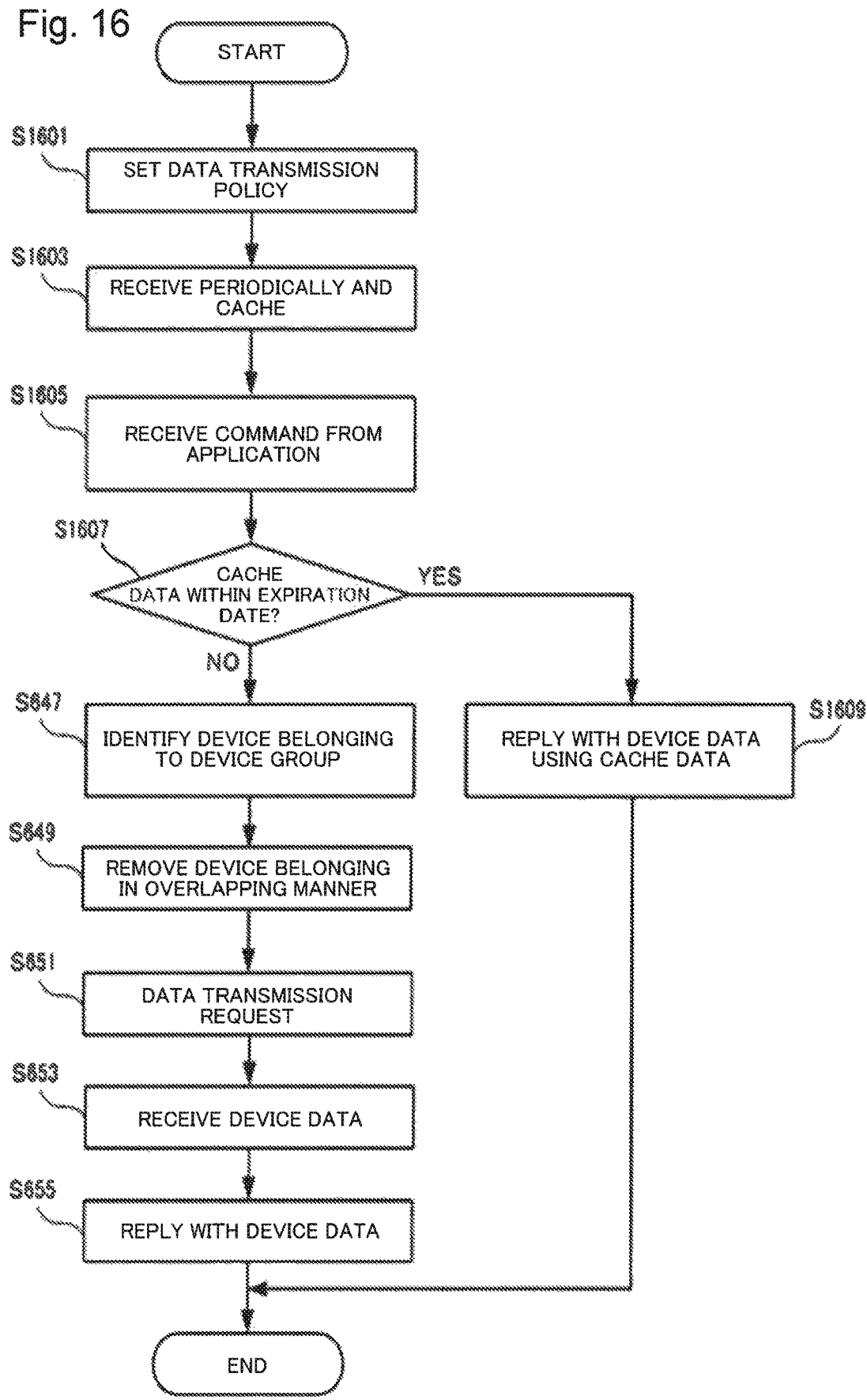
FIG. 16 is a flow chart illustrating a processing procedure of the information processing apparatus according to the fourth example embodiment of the present invention.

FIG. 16 is a flow chart illustrating a processing procedure of the information processing apparatus 1200 according to the example embodiment. This flow chart is executed by the CPU 510 of FIG. 15 by using the RAM 1540, and the function configuration unit of the information processing apparatus 1200 of the FIG. 13 is realized. Note that similar step numerals are used to the process similar to that of the FIG. 6B, and the detailed descriptions thereof are omitted.

In step S1601, the information processing apparatus 1200 sets a data transmission policy to a device. Note that the data transmission policy may be set by the information processing apparatus 1200 based on the instruction from the application 210, or may be independently set by the information processing apparatus 1200, or may be set preliminarily to the device.

In step S1603, the information processing apparatus 1200 receives the device data 221 that a device automatically and periodically transmits, and temporarily saves in the saving unit 806 as a cache. In step S1605, the information processing apparatus 1200 receives a command 211 such as a data transmission request from the application 210. In step S1607, the information processing apparatus 1200 determines whether the device data 221 cached in the saving unit 806 are within the expiration date or not. When the device data 221 are not within the expiration date (NO in step S1607), the information processing apparatus 1200 proceeds to step S647 and after. In contrast, when the device data 221 are within the expiration date (YES in step S1607), in step S1609, the information processing apparatus 1200 replies with the device data 221 cached in the saving unit 806 to the application 210.

With the example embodiment, when the device periodically and automatically transmits device data 221, transmitting data in an overlapping manner is not necessary. Thus, the congestion of the network band can be reduced.

Fifth Example Embodiment

Figure 17:
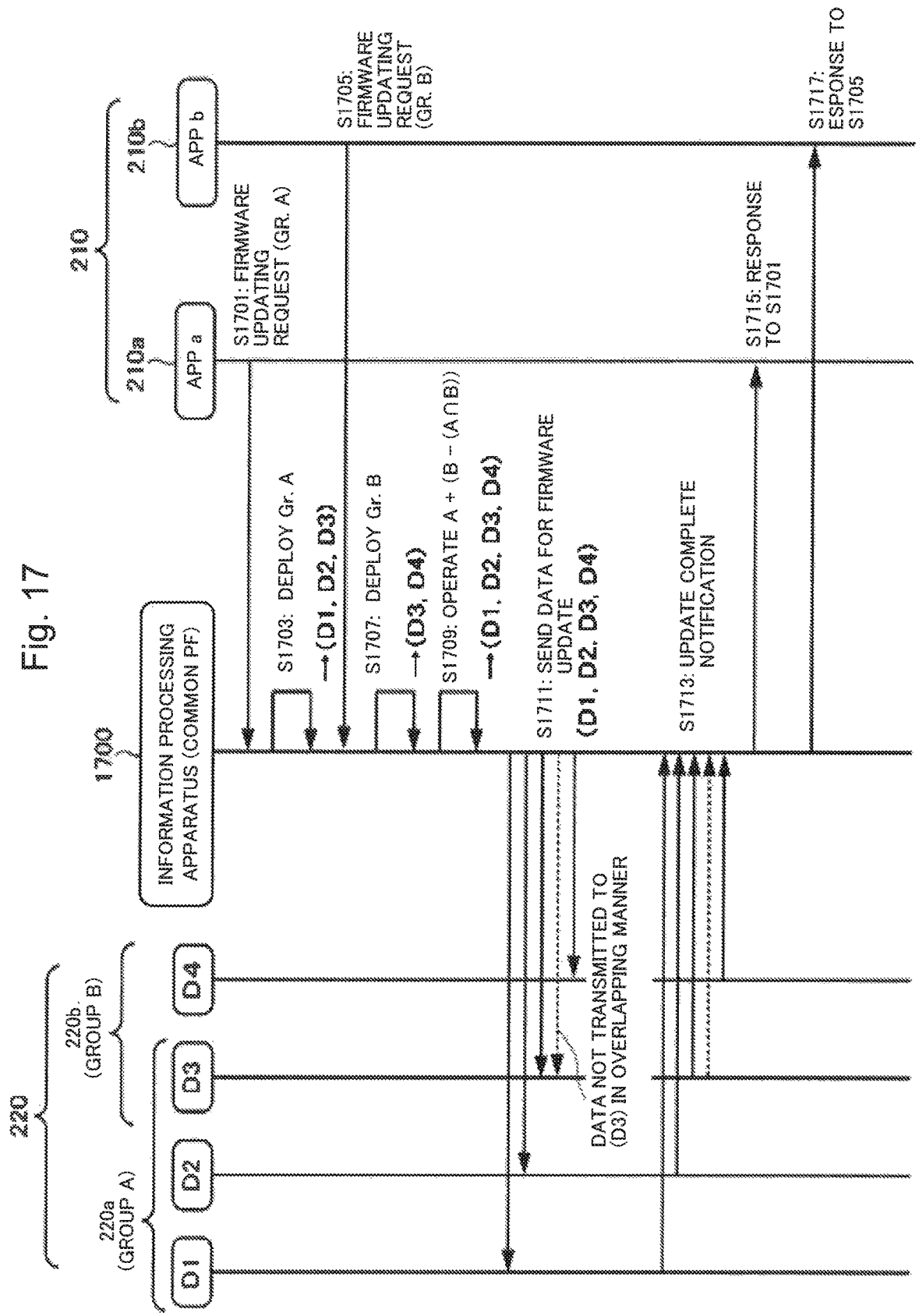
FIG. 17 is a sequence chart illustrating an overview of the processing by the information processing apparatus according to the fifth example embodiment of the present invention.

The information processing apparatus according to the fifth example embodiment of the present invention is described with reference to FIG. 17 to FIG. 21. FIG. 17 is a sequence chart illustrating an overall operation of the information processing apparatus according to the example embodiment. The information processing apparatus according to the example embodiment is different in that having a firmware updating unit that updates the firmware of the device, compared to the above-described second example embodiment to fourth example embodiment. Other configuration and operation are similar to that of the second example embodiment to the fourth example embodiment, thus similar reference numerals are used to the similar configuration and operation, and the detailed descriptions thereof are omitted.

In the following description, the descriptions will be made with an example of updating firmware, however, the range of application the example embodiment is not limited to the description. Similar can be applied to a command for updating device parameter, or an arbitrary command for another device, besides updating firmware.

FIG. 17 is a sequence chart illustrating an overall processing of the information processing apparatus 1700 according to the example embodiment. The sequence chart of FIG. 17 differs in that the data acquisition request illustrated in the sequence chart of FIG. 2C is replaced with a firmware updating request.

In step S1701, the information processing apparatus 1700 receives a firmware updating request (a command) from the application 210a (app a) to group 220a (group A). In step S1703, the information processing apparatus 1700 deploys the group 220a based on the firmware updating request from the application 210a in order to identify the device belonging to the group 220a. As a result, the information processing apparatus 1700 identifies that the devices belonging to the group 220a are D1, D2 and D3. Note that D3 is a device that belongs to multiple device groups 220 (group 220a and group 220b). In addition, the firmware updating request is assumed to be a command that can accept a delay. Therefore, the information processing apparatus 1700 waits for the firmware updating request from another application 210b for a predetermined period.

In step S1705, the information processing apparatus 1700 receives a firmware updating request (a command) from the application 210b (app b) to the group 220b (group B). In step S1707, the information processing apparatus 1700 deploys the group 220b based on the firmware updating request from the application 210b in order to identify the device belonging to the group 220b. As a result, the information processing apparatus 1700 identifies that the devices that belong to the group 220b are D3 and D4.

In step S1709, the information processing apparatus 1700 operates B−(A∩B) in such a way not to transmit a command in an overlapping manner to the device (D3) belonging to the group 220a and the group 220b. Then, the information processing apparatus 200 acquires (D1, D2, D3, D4) by combining the operation result and the result of deploying the group 220a.

In step S1711, the information processing apparatus 1700 transmits the data for updating the firmware to the devices (D1, D2, D3, D4) belonging to the group 220a and the group 220b. Note that, in this case, the data for updating the firmware are not transmitted to the device (D3) in an overlapping manner.

In step S1713, the information processing apparatus 1700 receives the notification that the firmware update is complete as device data from each device. In step S1715, the information processing apparatus 1700 transmits the notification that the firmware update is complete as device data to the application 210a as the response to step S1701. Similarly, in step S1717, the information processing apparatus 1700 transmits the notification that the firmware update is complete as the device data to the application 210b as the response to step S1705.

Figure 18:
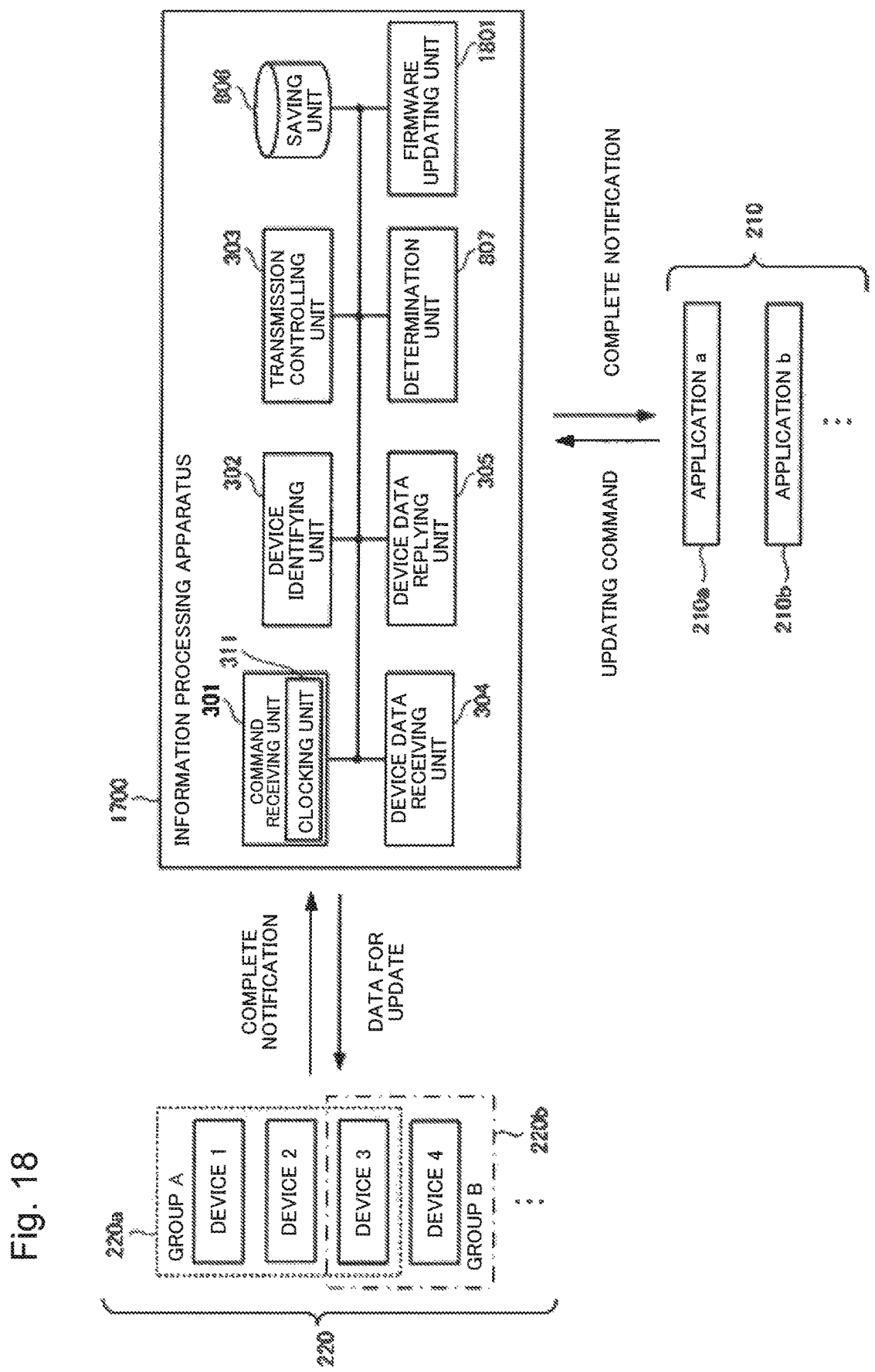
FIG. 18 is a block diagram illustrating a configuration of the information processing apparatus according to the fifth example embodiment of the present invention.

Note that, in the case of a firmware update for a device (D3) that belongs to a plurality of device groups 220, when an update to different versions is requested, in other words, conflicted update requests to different versions exists, the information processing apparatus 1700 may have the update to the latest version to take precedence, for example. For example, when application 210a requests the update to version 1.0 and application 210b requests the update to version 2.0, the information processing apparatus 1700 may have the update to version 2.0 to take precedence. Alternatively, for example, the user may decide which version to update to, the latest request may take precedence, or the application 210 may have priority, and the update to the version designated by a request form an application with higher priority may be performed. Moreover, when a conflicted update requests are performed, the information processing apparatus 1700 may cancel the transmission of the data for firmware update. When the update requests conflict, which update request takes precedence is not limited to the methods described herein, and various methods based on the characteristics or attributes of the device, or characteristics of the application may be adopted FIG. 18 is a block diagram illustrating a configuration of the information processing apparatus 1700 according to the example embodiment. The information processing apparatus 1700 further includes a firmware updating unit 1801. The firmware updating unit 1801 updates the firmware of a device that belongs to the device group 220, based on the command from the application 210.

FIG. 19 is a diagram illustrating a configuration of a firmware table 1901 included in the information processing apparatus according to the example embodiment. The firmware table 1901 stores the firmware 1911, with the relation to the device ID 911. The firmware 1911 is a piece of information about the version, expiration date, and update date and the like of the firmware. The firmware updating unit 1801 refers to the firmware table 1901, confirms the version of the device firmware, and performs the firmware update.

Figure 20:
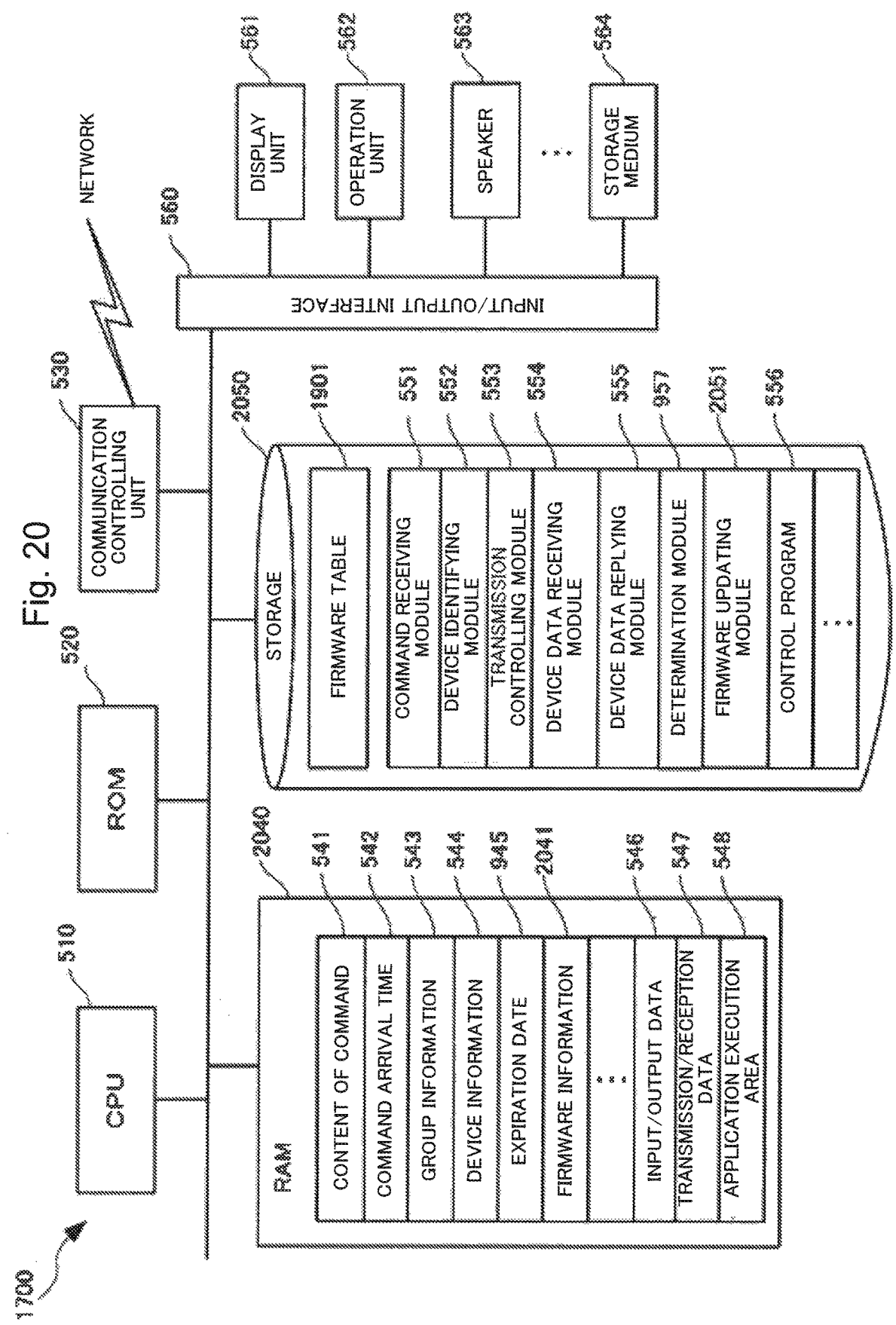
FIG. 20 is a block diagram illustrating a hardware configuration of the information processing apparatus according to the fifth example embodiment of the present invention.

FIG. 20 is a block diagram illustrating a hardware configuration of the information processing apparatus 1700 according to the example embodiment. A RAM 2040 is a random access memory that the CPU 510 uses as a work area for temporary storage. An area for storing necessary data for realizing the example embodiment is secured in the RAM 2040. Firmware information 2041 is a piece of information about the device firmware, and is temporarily stored in the RAM 2040. The firmware information 2041 may be read out to the RAM 2040 from a database storing a firmware version and the like that is not illustrated.

In the storage 2050, databases, various parameters, or the following data or program for realizing the example embodiment are stored. The firmware table 1901 is a table with the configuration illustrated in the FIG. 19, and is stored in the storage 2050. The storage 2050 further stores a firmware updating module 2051. The firmware updating module 2051 is a module that updates the device firmware. This module 2051 is read out by the CPU 510 to the application execution area 548 of the RAM 2040, and is executed.

Figure 21:
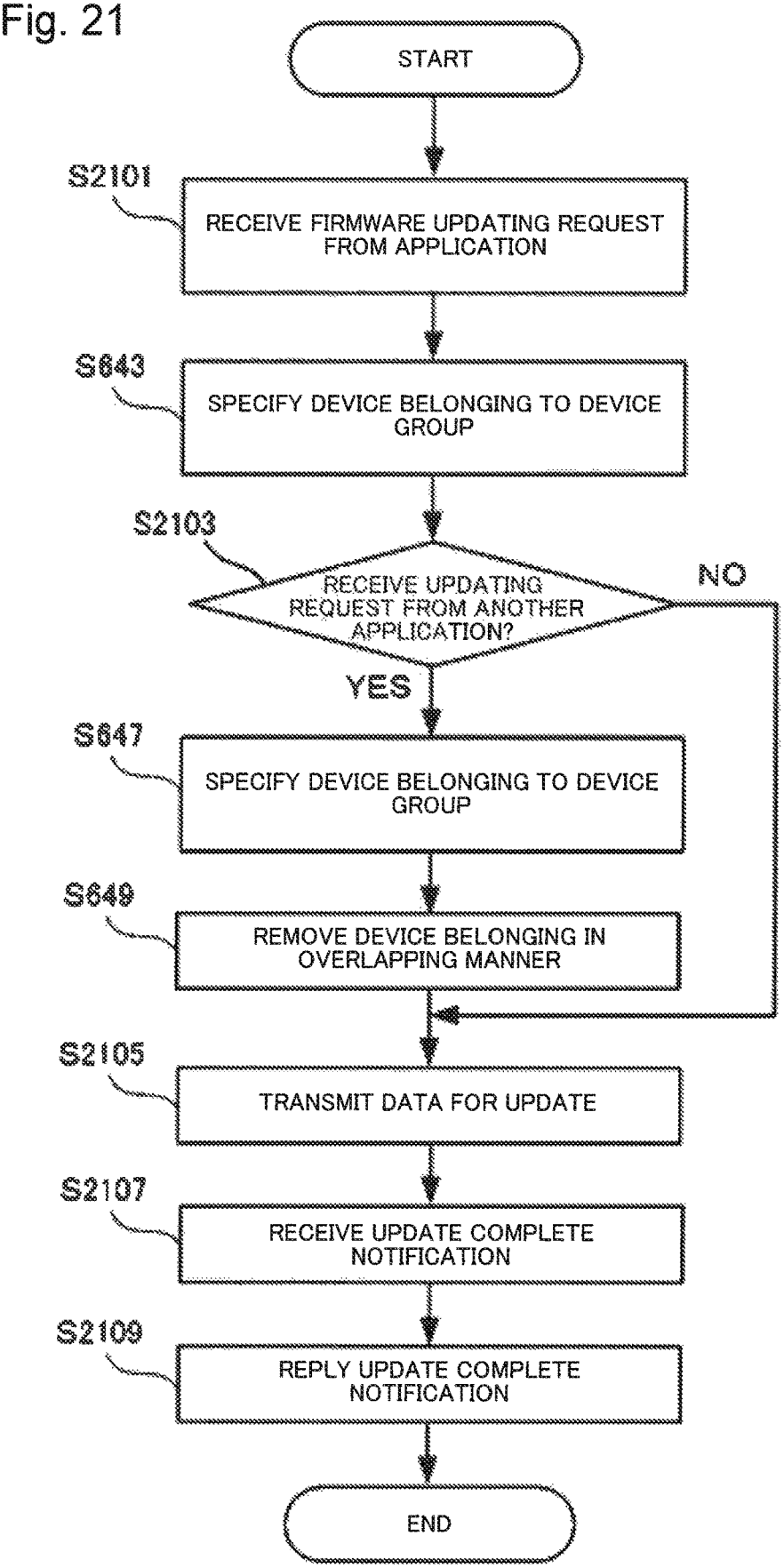
FIG. 21 is a flow chart illustrating a processing procedure of the information processing apparatus according to the fifth example embodiment of the present invention.

FIG. 21 is a flow chart illustrating a processing procedure of the information processing apparatus according to the example embodiment. This flow chart is executed by the CPU 510 of FIG. 20 by using the RAM 2040, and the function configuration unit of the information processing apparatus 1700 of the FIG. 18 is realized. Note that similar step numerals are used to the similar process as that of the FIG. 6B, and the detailed descriptions thereof are omitted.

In step S2101, the information processing apparatus 1700 receives a firmware updating request from the application 210a. In step S2103, the information processing apparatus 1700 determines whether a firmware updating request is received from another application 210 within a predetermined period or not. When the firmware updating request is not received from another application 210b within the predetermined period (NO in step S2103), the information processing apparatus 1700 proceeds to step S2105. When the firmware updating request is received from another application 210b within the predetermined period (YES in step S2103), the information processing apparatus 1700 proceeds to step S647.

In step S2105, the information processing apparatus 1700 sends the data for updating the firmware to the devices (D1 to D4). In step S2107, the information processing apparatus 1700 receives the notification that the firmware update is complete as device data from the devices (D1 to D4). In step S2109, the information processing apparatus 1700 replies with the notification that the firmware update is complete as device data to the application 210a and the application 210b.

The example embodiment may be applied to the case the application side transmits various programs or data to the devices, not only to the case the application collects device data of a device. In addition, the data for firmware update are not transmitted in an overlapping manner, so the congestion of the network band can be reduced, and from the viewpoint of the device side, the firmware is not updated in an overlapping manner.

Other Example Embodiments

The present invention has been described above with the example embodiments, however, the present invention is not limited to the above-described example embodiments. Within the scope of the present invention, the present invention may be applied with various changes that may be understood by a person skilled in the art. In addition, a system or an apparatus that arbitrarily combines separate characteristics included in each example embodiment is included in the scope of the present invention.

Note that the information processing apparatus may be, for example, an M2M platform, and an M2M Service Infrastructure defined by oneM2M that standardizes Machine to Machine services. The M2M Service Infrastructure corresponds to an IN (Infrastructure Node) of the oneM2M architecture. Moreover, the M2M Service Infrastructure has a CSE (Common Services Entity) that provides a group of common service functions (CSF: Common Services Function) defined by oneM2M. In addition, the information processing apparatus may be an apparatus that includes a plurality of CSEs. The CSE included in an IN is also referred as the IN (Infrastructure Node)-CSE.

The network may be, for example, a mobile communication network provided by a communication carrier, and may be an Underlying Network defined by oneM2M.

In addition, the device may be, for example, a sensor device, and may be an M2M Device defined by oneM2M. An M2M Device corresponds to an ASN (Application Service Node) or an ADN (Application Dedicated Node) in oneM2M architecture, and the ASN has a CSE. The CSE within the ASN is also referred to as the ASN-CSE.

An application server that is not illustrated and further processes the data collected from devices may be, for example, a server that processes a specific duty, and may be an M2M Application Infrastructure defined by oneM2M. The application may also have an AE (Application Entity) in oneM2M architecture. The AE existing within an Infrastructure Domain defined by oneM2M and coupled to the IN-CSE is also referred to as the IN (Infrastructure Node)-AE.

The information processing apparatus may be, for example, a mobile router, and in this case, an M2M Gateway (a gateway apparatus) defined by oneM2M. An M2M Gateway corresponds to an MN (Middle Node) of the oneM2M architecture, and has a CSE. The CSE within the MN is also referred to as the MN-CSE.

The present invention may be applied to a system consisting of a plurality of devices, or may be applied to a single apparatus. Moreover, the present invention can also be applied when the information processing program that realizes a function of the example embodiments is provided directly or from remote place to the system or the apparatus. Therefore, in order to realize the function of the present invention with a computer, a program installed to a computer, a storage medium stored with the program, a WWW (World Wide Web) server for enabling download of the program, are within the scope of the present invention. A non-transitory computer readable medium stored with a program causing a computer to perform the processing steps included in the above-described example embodiments is included in the scope of the present invention.

This application claims the benefit of Japanese Patent Application No. 2016-035407, filed on Feb. 26, 2016, the entire disclosure of which is incorporated by reference herein.

What is claimed is:

1. An information processing apparatus comprising:
a processor; and
a memory storing program instructions executable by the processor to:
receive a command for at least two device groups, the command supplied from at least one application;
identify a device that belongs to the at least two device groups when commands from the at least one application to the at least two device groups are commands of a similar type; and
control transmission in such a way not to transmit the commands of the similar type to the identified device in an overlapping manner, wherein
when the processor receives the commands of the similar type from the at least one application a plurality of times within a predetermined period, the processor identifies a device that belongs to the at least two device groups based on the commands received a plurality of times.

2. The information processing apparatus according to claim 1, wherein the instructions are further executable by the processor to:
control the replying with device data received from the identified device to the at least one application.

3. The information processing apparatus according to claim 2, wherein the instructions are further executable by the processor to:
set a data transmission policy for the device, wherein
the processor receives device data transmitted from the device based on the data transmission policy.

4. The information processing apparatus according to claim 1, wherein the instructions are further executable by the processor to:
temporarily save the device data; and
determine whether device data that has been saved are within an expiration date or not;
wherein:
the processor replies with received device data from the identified device when device data saved in the saving unit are within an expiration date as a result of determination as to whether the device data are within the expiration date or not.

5. The information processing apparatus according to claim 4, wherein
the processor transmits the similar type command again to the identified device when the expiration date is expired.

6. The information processing apparatus according to claim 1, wherein
the processor further controls a transmission of the similar type command in accordance with priority of the at least one application.

7. An information processing method comprising:
receiving a command for at least two device groups, the command supplied from at least one application;
identifying a device that belongs to the at least two device groups when commands from the at least one application to the at least two device groups are commands of a similar type; and controlling transmission in such a way not to transmit the commands of the similar type to the identified device in an overlapping manner, wherein when the commands of the similar type are received from the at least one application a plurality of times within a predetermined period, a device that belongs to the at least two device groups is identified based on the commands received a plurality of times.

8. A computer-readable non-transitory recording medium on which an information processing program is recorded, the program causing a computer to perform an information processing process, the information processing process comprising:

receiving a command for at least two device groups, the command supplied from at least one application;

identifying a device that belongs to the at least two device groups when commands from the at least one application to the at least two device groups are commands of a similar type; and controlling transmission in such a way not to transmit the commands of the similar type to the identified device in an overlapping manner, wherein when the commands of the similar type are received from the at least one application a plurality of times within a predetermined period, a device that belongs to the at least two device groups is identified based on the commands received a plurality of times.

* * * * *